United States Patent
Caraccio et al.

(10) Patent No.: US 11,579,970 B2
(45) Date of Patent: Feb. 14, 2023

(54) MAINTENANCE COMMAND INTERFACES FOR A MEMORY SYSTEM

(71) Applicant: Micron Technology, Inc., Boise, ID (US)

(72) Inventors: Danilo Caraccio, Milan (IT); Daniele Balluchi, Cernusco sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/375,832

(22) Filed: Jul. 14, 2021

(65) Prior Publication Data
US 2022/0035701 A1 Feb. 3, 2022

Related U.S. Application Data

(60) Provisional application No. 63/058,895, filed on Jul. 30, 2020.

(51) Int. Cl.
*G11C 29/00* (2006.01)
*G06F 11/10* (2006.01)
(Continued)

(52) U.S. Cl.
CPC ........ *G06F 11/1068* (2013.01); *G06F 11/076* (2013.01); *G06F 11/0772* (2013.01);
(Continued)

(58) Field of Classification Search
CPC ............. G06F 11/1068; G06F 11/0772; G06F 11/3037; G06F 11/076; G06F 12/0238; G06F 2212/7201
See application file for complete search history.

(56) References Cited

U.S. PATENT DOCUMENTS

2018/0039578 A1 2/2018 Yun et al.
2018/0165172 A1 6/2018 Lin
(Continued)

OTHER PUBLICATIONS

ISA/kR, International Search Report and Written Opinion of the International Searching Authority, Int'l Appl. No. PCT/US2021/042175, dated Oct. 29, 2021, Korean Intellectual Property Office, Seo-gu, Daejeon, Republic of Korea, 10pgs.

*Primary Examiner* — Samir W Rizk
(74) *Attorney, Agent, or Firm* — Holland & Hart LLP

(57) ABSTRACT

Methods, systems, and devices for maintenance command interfaces for a memory system are described. A host system and a memory system may be configured according to a shared protocol that supports enhanced management of maintenance operations between the host system and memory system, such as maintenance operations to resolve error conditions at a physical address of a memory system. In some examples, a memory system may initiate maintenance operations based on detections performed at the memory system, and the memory system may provide a maintenance indication for the host system. In some examples, a host system may initiate maintenance operations based on detections performed at the host system. In various examples, the described maintenance signaling may include capability signaling between the host system and memory system, status indications between the host system and memory system, and other maintenance management techniques.

27 Claims, 12 Drawing Sheets

(51) Int. Cl.
  *G06F 11/07* (2006.01)
  *G06F 11/30* (2006.01)
  *G06F 12/02* (2006.01)

(52) U.S. Cl.
  CPC ...... *G06F 11/3037* (2013.01); *G06F 12/0238* (2013.01); *G06F 2212/7201* (2013.01)

(56) References Cited

U.S. PATENT DOCUMENTS

2020/0034307 A1\* 1/2020 Duzly ................. G06F 12/0246
2020/0117558 A1 4/2020 Wilson
2020/0167231 A1 5/2020 Kim et al.

\* cited by examiner

MAINTENANCE COMMAND INTERFACES FOR A MEMORY SYSTEM

CROSS REFERENCE

The present application for patent claims the benefit of U.S. Provisional Patent Application No. 63/058,895 by CARACCIO et al., entitled "MAINTENANCE COMMAND INTERFACES FOR A MEMORY SYSTEM," filed Jul. 30, 2020, assigned to the assignee hereof, and expressly incorporated by reference herein.

BACKGROUND

The following relates generally to one or more systems for memory and more specifically to maintenance command interfaces for a memory system.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
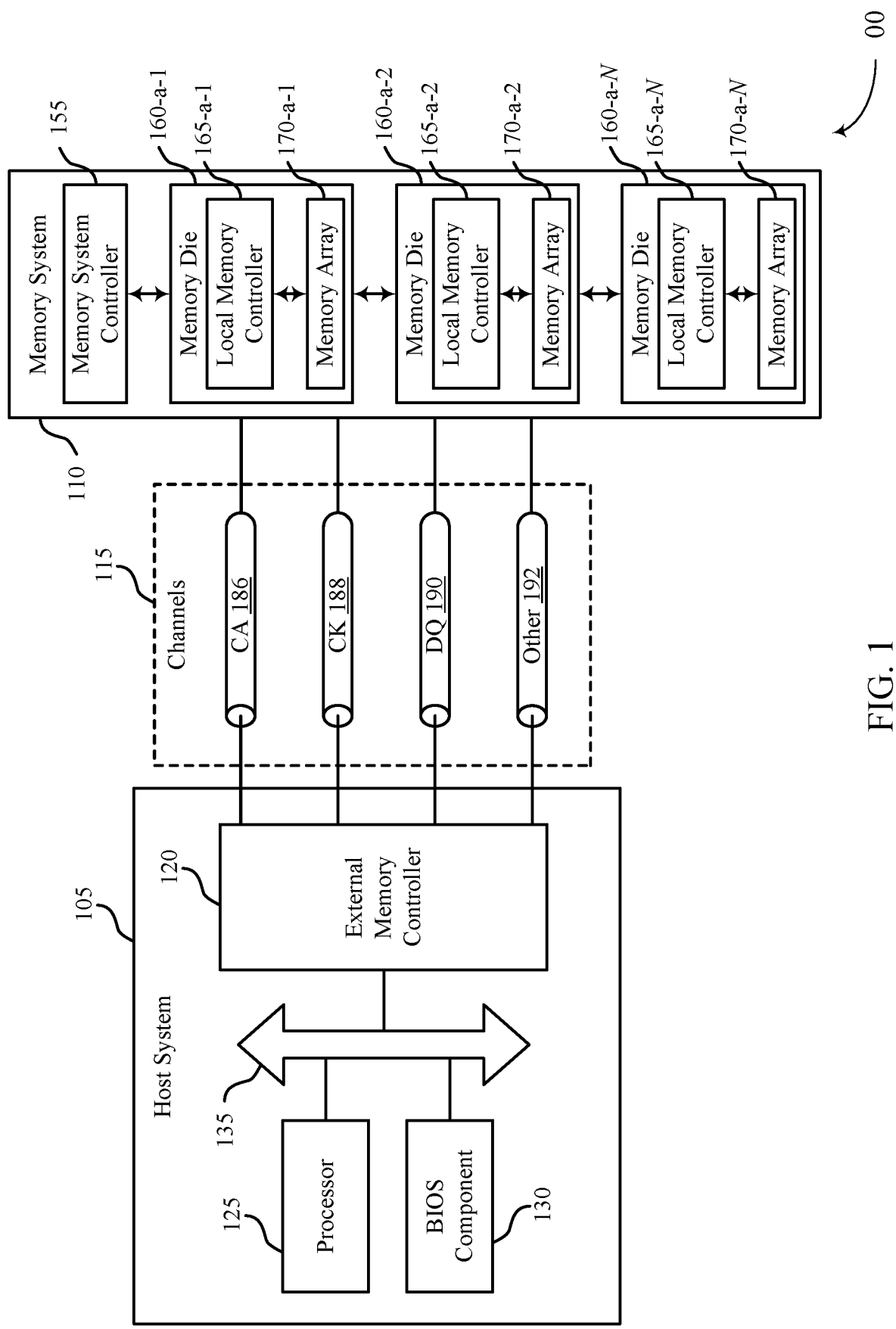
FIG. 1 illustrates an example of a system that supports maintenance command interfaces for a memory system in accordance with examples as disclosed herein.

Some memory systems may include one or more memory dies, which may be referred to as memory chips. A memory system may include a memory system controller for performing operations on the memory dies, and for interfacing with a host system coupled with the memory system (e.g., for exchanging information or commands via a memory interface). In some examples, on-field or in-operation maintenance actions may be needed by the memory system during its lifecycle, which may include operations such as post-package repair (PPR). However, some memory management techniques may lack commands or protocols between a memory system and a host system for managing maintenance operations to resolve error conditions of the memory system.

In accordance with examples as disclosed herein, a host system and a memory system may be configured according to a shared protocol that supports enhanced management of maintenance operations between the host system and memory system, such as maintenance operations to resolve error conditions at a physical address of a memory system (e.g., at a physical address of a memory die of the memory system, maintenance operations implemented by a controller such as a controller of the memory system that may copy data from one or more addresses that are in need of repair to one or more resources in the controller such as static random access memory (SRAM) and the controller may manage an update such as a remap of the one or more addresses into other resources that contain the accurate data). In some examples, the described techniques may support a memory system initiating maintenance operations based on detections performed at the memory system. The memory system may provide a maintenance indication for the host system, which may include a request to perform a maintenance operation (e.g., requesting permission from the host system, requesting an explicit maintenance command from the host system) or an indication that the memory system is proceeding with a maintenance operation. In some examples, the described techniques may support a host system initiating maintenance operations based on detections performed at the host system. In various examples, the described maintenance signaling may include capability signaling between the host system and memory system, status indications between the host system and memory system, and other maintenance management techniques.

By supporting these and other techniques related to the management of maintenance operations between a host system and memory system, a system may provide various improvements to operation of the host system and memory system. For example, the described techniques may support more-reliable operation, prioritization among operations (e.g., prioritizing access operations versus maintenance operations), more efficient operation (e.g., delaying or canceling maintenance operations, retiring memory addresses that are no longer needed), reduced latency, or improved throughput, among other benefits compared with other memory techniques.

Features of the disclosure are initially described in the context of systems and dies as described with reference to FIGS. 1 and 2. Features of the disclosure are described in the context of systems and associated signaling and operations as described with reference to FIGS. 3-6. These and other features of the disclosure are further illustrated by and described with reference to an apparatus diagram and flowcharts that relate to maintenance command interfaces for a memory system as described with reference to FIGS. 7-12.

FIG. 1 illustrates an example of a system 100 that supports maintenance command interfaces for a memory system in accordance with examples as disclosed herein. The system 100 may include a host system 105 (e.g., a host device), a memory system 110 (e.g., a memory module, a memory device), and a plurality of channels 115 coupling the host system 105 (e.g., according to a memory interface, according to a memory protocol) with the memory system 110. The system 100 may include one or more memory systems 110, but aspects of the one or more memory systems 110 may be described in the context of a single memory system (e.g., memory system 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory system 110 may be a component of the system operable to store data for one or more other components of the system 100.

At least portions of the system 100 may be examples of the host system 105. The host system 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host system 105 may refer to the hardware, firmware, software, or a combination thereof that implements the functions of an external memory controller 120. In some examples, the external memory controller 120 may be referred to as a host or a host system 105.

A memory system 110 may be an independent device or a component that is operable to provide physical memory addresses/space that may be used or referenced by the system 100. In some examples, a memory system 110 may be configurable to work with one or more different types of host systems. Signaling between the host system 105 and the memory system 110 may be operable to support one or more of: modulation schemes to modulate the signals, various pin configurations for communicating the signals, various form factors for physical packaging of the host system 105 and the memory system 110, clock signaling and synchronization between the host system 105 and the memory system 110, timing conventions, or other factors.

The memory system 110 may be operable to store data for the components of the host system 105. In some examples, the memory system 110 may act as a slave-type device to the host system 105 (e.g., responding to and executing commands provided by the host system 105 through the external memory controller 120). Such commands may include one or more of a write command for a write operation, a read command for a read operation, a refresh command for a refresh operation, or other commands.

The host system 105 may include one or more of an external memory controller 120, a processor 125, a basic input/output system (BIOS) component 130, or other components such as one or more peripheral components or one or more input/output controllers. The components of host system 105 may be coupled with one another using a bus 135.

The processor 125 may be operable to provide control or other functionality for at least portions of the system 100 or at least portions of the host system 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPCPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host system 105. The BIOS component 130 may also manage data flow between the processor 125 and the various components of the system 100 or the host system 105. The BIOS component 130 may include a program or software stored in one or more of read-only memory (ROM), flash memory, or other non-volatile memory.

The memory system 110 may include a memory system controller 155 and one or more memory dies 160 (e.g., memory chips) to support a desired capacity or a specified capacity for data storage. Each memory die 160 may include a local memory controller 165 (e.g., local memory controller 165-$a$, local memory controller 165-$b$, local memory controller 165-N) and a memory array 170 (e.g., memory array 170-$a$, memory array 170-$b$, memory array 170-N). A memory array 170 may be a collection (e.g., one or more grids, one or more banks, one or more tiles, one or more sections) of memory cells, with each memory cell being operable to store at least one bit of data. A memory system 110 including two or more memory dies 160 may be referred to as a multi-die memory or a multi-die package or a multi-chip memory or a multi-chip package.

The memory system controller 155 may include circuits, logic, or components operable to control operation of the memory system 110. The memory system controller 155 may include the hardware, the firmware, or the instructions that enable the memory system 110 to perform various operations and may be operable to receive, transmit, or execute commands, data, or control information related to the components of the memory system 110. The memory system controller 155 may be operable to communicate with one or more of the external memory controller 120, the one or more memory dies 160, or the processor 125. In some examples, the memory system controller 155 may control operation of the memory system 110 described herein in conjunction with the local memory controller 165 of the memory die 160.

In some examples, the memory system 110 (e.g., the memory system controller 155) may receive data or commands or both from the host system 105 (e.g., via one or more channels 115, according to a memory interface or memory protocol). For example, the memory system 110 may receive a write command indicating that the memory system 110 is to store data for the host system 105 or a read command indicating that the memory system 110 is to provide data stored in a memory die 160 to the host system 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the memory system controller 155. In some examples, a memory system 110 may not include a memory system controller 155, and a local memory controller 165, or the external memory controller 120 may perform various functions described herein. As such, a local memory controller 165 may be operable to communicate with the memory system controller 155, with other local memory controllers 165, or directly with the external memory controller 120, or the processor 125, or a combination thereof. Examples of components that may be included in the memory system controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the memory system controller 155 or local memory controller 165 or both. In some examples of the present disclosure, one or more maintenance operations may be implemented by a controller (e.g., memory system controller 155, local memory controller 165-a-1, external memory controller 120), such as a controller of the memory system, that may implement one or more maintenance operations. For example, the controller (e.g., that may be inside a memory module) may copy data from one or more addresses (e.g., one or more component rows) that are in need of repair to one or more resources in or coupled with the controller (e.g., dedicated SRAM for the controller, SRAM or other storage coupled with the controller). The controller may be configured to manage an update (e.g., a remap, a write) of the one or more addresses into a second one or more resources in or coupled with the controller (e.g., dedicated SRAM for the controller, SRAM or other storage coupled with the controller), such as a remap of the one or more addresses into other resources that contain the accurate data.

The external memory controller 120 may be operable to enable communication of one or more of information, data, or commands between components of the system 100 or the host system 105 (e.g., the processor 125) and the memory system 110. The external memory controller 120 may convert or translate communications exchanged between the components of the host system 105 and the memory system 110. In some examples, the external memory controller 120 or other component of the system 100 or the host system 105, or its functions described herein, may be implemented by the processor 125. For example, the external memory controller 120 may be hardware, firmware, or software, or some combination thereof implemented by the processor 125 or other component of the system 100 or the host system 105. Although the external memory controller 120 is depicted as being external to the memory system 110, in some examples, the external memory controller 120, or its functions described herein, may be implemented by one or more components of a memory system 110 (e.g., a memory system controller 155, a local memory controller 165) or vice versa.

The components of the host system 105 may exchange information with the memory system 110 using one or more channels 115. The channels 115 may be operable to support communications between the external memory controller 120 and the memory system 110. Each channel 115 may be examples of transmission mediums that carry information between the host system 105 and the memory system 110. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host system 105 and one or more pins or pads at the memory system 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host system 105 and the memory system 110 including control information associated with the commands (e.g., address information). For example, commands carried by the CA channel 186 may include a read command with an address of the desired data. In some examples, a CA channel 186 may include any number of signal paths to decode one or more of address or command data (e.g., eight or nine signal paths).

In some examples, data channels 190 may be operable to communicate one or more of data or control information between the host system 105 and the memory system 110. For example, the data channels 190 may communicate information (e.g., bi-directional) to be written to the memory system 110 or information read from the memory system 110.

In some examples, the one or more other channels 192 may include one or more error detection code (EDC) channels. The EDC channels may be operable to communicate error detection signals, such as checksums, to improve system reliability. An EDC channel may include any quantity of signal paths.

In some examples, an interface between the host system 105 and the memory system 110 may support operations or communications according to a Compute Express Link (CXL) standard, or other protocol that may specify a relatively low-latency, high bandwidth discrete or on-package link that supports dynamic protocol multiplexing of coherency, memory access, or I/O protocols. In some examples, a memory system 110 in accordance with such protocols may include host-managed device memory (HDM), which may refer to device-attached memory mapped to a system-coherent address space and accessible to the host system 105 using standard write-back semantics. In some examples, a memory system 110 in accordance with such protocols may include private device memory (PDM), which may refer to device-attached memory that is not mapped to system address space or directly accessible to the host system 105 as cacheable memory (e.g., as in some PCIe devices). In some examples, such protocols may support using an accelerator to access system memory as a caching agent or host system memory, where an accelerator may include devices that may be used by software running on processors of the host system 105 to offload or perform computation or I/O tasks. Examples of accelerators may include programmable agents (e.g., a GPU, a GPCPU), fixed-function agents, or reconfigurable agents such as FPGAs.

In some examples, memory systems 110 may refer to devices that include memory (e.g., double data rate (DDR) memory, high bandwidth memory (HBM), memory dies 160) attached to the device (e.g., a Type 2 Device according to a CXL protocol). Such devices may execute against memory but their performance may involve relatively high bandwidth between an accelerator and the device-attached memory. A goal for some memory protocols may be to provide a means for the host system 105 to push operands into the memory system 110 (e.g., device-attached memory) and for the host system 105 to pull results out of the memory system 110 in a manner that avoids software and hardware cost that might offset benefits of an accelerator. In some examples, such coherent-address device-attached memory may be referred to as HDM.

In some examples, memory systems 110 may refer to a device without an active computation engine, and may be configured as a memory expander for a host system 105 (e.g., a Type 3 Device according to a CXL protocol). In some examples, such a configuration may not involve an accelerator, and the device may not transmit any requests over an agency coherence protocol that supports device caching of host memory (e.g., over a CXL.cache). Rather, in some examples, such a configuration may operate primarily over a memory access protocol that supports device-attached memory (e.g., over a CXL.mem). Such an architecture may be independent of memory technology and may allow for a range of memory organization techniques depending on support implemented in a host system 105.

In some examples, a host system 105, a memory system 110, or both may support various protocols for addressing and address translations. For example, a host physical address (HPA) may be used to communicate a logical address between a host system 105 and a memory system 110 (e.g., an address included in commands from the host system 105). In some examples, a device physical address (DPA) may be an address decoded by a memory system 110 at a host-managed device memory (HDM) decoder of the memory system 110, where such a decoding may start from a received HPA (e.g., when decoding an HPA in a command from the host system 105). At a memory system 110, a DPA may refer to a logical address that is mapped to a physical address (e.g., a channel, rank, bank, bank group, row, or column), which may be a mapping according to a logical-to-physical (L2P) mapping or L2P table at the memory system 110, and may further include a mapping to a particular memory die 160 of the memory system 110 (e.g., of a plurality of memory dies 160 of the memory system 110). The DPA may refer to a contiguous address space of the memory system 110.

In some examples, the system 100 may include a switch that includes a further HDM decoder. Such a switch may refer to a component of a host system 105, or a component between a host system 105 and one or more memory systems 110, that may support various memory interleaving techniques. For example, memory interleaving via a switch with an HDM decoder may support consecutive memory addresses from the perspective of the host system 105 being mapped to different memory systems 110 (e.g., consecutive HPAs, which may be mapped at a uniform interval). At each of a set of interleaved memory systems 110, the respective memory system 110 may convert an HPA from the switch, into a DPA at the respective memory system 110.

In some examples, on-field or in-operation maintenance actions may be needed to resolve errors at a memory system 110, which may include operations such as post-package repair (PPR) at the memory system 110. However, some memory management techniques may lack commands, protocols, or handshaking between a memory system 110 and a host system 105 for managing maintenance operations to resolve such error conditions of a memory system 110. For example, a memory system 110 may be configured to store various event records (e.g., in a mode register of the memory system), such as a general media event record, a DRAM event record, a memory module event record, or a vendor-specific event record, or various combinations thereof. However, such event records may lack a prescription of actions by a host system 105 when a maintenance flag is raised, or may lack an indication to a host system 105 that a memory system 110 is requesting or has initiated maintenance operations.

In accordance with examples as disclosed herein, a host system 105 and a memory system 110 may be configured according to a shared protocol that supports enhanced management of maintenance operations between the host system 105 and memory system 110, such as maintenance operations to resolve error conditions at a physical address of a memory system 110 (e.g., at a physical address of a memory die 160 of the memory system 110) or as maintenance operations to resolve error conditions at a physical address of a memory system 110. In some examples, the described techniques may support a memory system 110 initiating maintenance operations based on detections performed at the memory system 110. The memory system 110 may provide a maintenance indication for a host system 105, which may include a request to perform a maintenance operation (e.g., requesting permission from the host system 105, requesting an explicit maintenance command from the host system 105 to initiate a maintenance operation) or an indication that the memory system 110 is proceeding with a maintenance operation. In some examples, the described techniques may support a host system 105 initiating maintenance operations based on detections performed at the host system 105. In various examples, the described maintenance signaling may include capability signaling between a host system 105 and a memory system 110, status indications between a host system 105 and a memory system 110, and other maintenance management techniques.

By supporting these and other techniques related to the management of maintenance operations between a host system 105 and memory system 110, the system 100 may provide various improvements to operation of the host system 105 and the memory system 110. For example, the described techniques may support more-reliable operation, prioritization among operations (e.g., prioritizing access operations versus maintenance operations), more efficient operation (e.g., delaying or canceling maintenance operations, retiring memory addresses that are no longer needed), reduced latency, or improved throughput, among other benefits compared with other memory techniques.

Figure 2:
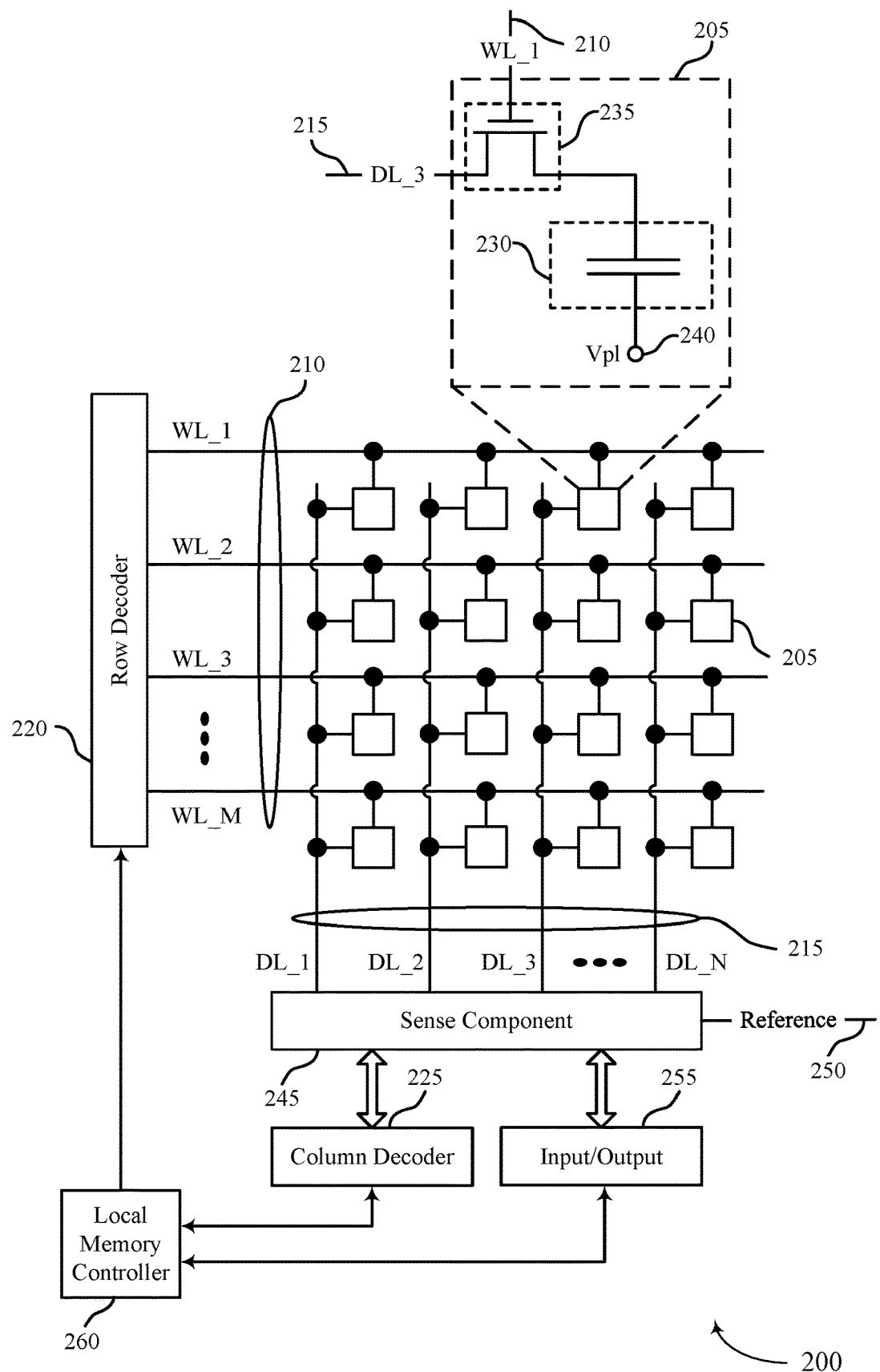
FIG. 2 illustrates an example of a memory die that supports maintenance command interfaces for a memory system in accordance with examples as disclosed herein.

FIG. 2 illustrates an example of a memory die 200 that supports maintenance command interfaces for a memory system in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205 (e.g., a physical address).

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host system 105, another controller associated with the memory die 200), translate the commands or the data (or both) into information that can be used by the memory die 200, perform one or more operations on the memory die 200, and communicate data from the memory die 200 to a host system 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200. In some examples of the present disclosure, one or more maintenance operations may be implemented by a controller (e.g., local memory controller 260), such as a controller of the memory system, that may implement one or more maintenance operations. For example, the controller (e.g., that may be inside a memory module) may copy data from one or more addresses (e.g., one or more component rows) that are in need of repair to one or more resources in or coupled with the controller (e.g., dedicated SRAM for the controller, SRAM or other storage coupled with the controller). The controller may be configured to manage an update (e.g., a remap, a write) of the one or more addresses into a second one or more resources in or coupled with the controller (e.g., dedicated SRAM for the controller, SRAM or other storage coupled with the controller), such as a remap of the one or more addresses into other resources that contain the accurate data.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host system 105). The local memory controller 260 may be operable to perform other access operations not listed here or other operations related to the operating of the memory die 200 that are not directly related to accessing the memory cells 205.

The local memory controller 260 may be operable to perform a read operation (e.g., a sense operation) on one or more memory cells 205 of the memory die 200. During a read operation, the logic state stored in a memory cell 205 of the memory die 200 may be determined. The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference 250. Based on that comparison, the sense component 245 may determine a logic state that is stored on the memory cell 205.

In some examples, a memory system 110 that includes the memory die 200 may be configured according to a shared protocol that supports enhanced management of maintenance operations between the memory system 110 and a host system coupled with the memory system 110, such as maintenance operations to resolve error conditions at a physical address of the memory die 200. In some examples, such maintenance operations may include performing a post-package repair on the memory die 200. For example, the memory die 200 may be configured to remap one or more addresses (e.g., rows, columns) to a different portion of a memory array of the memory die 200, or otherwise mapping or enabling different memory cells 205 of the memory die. In some examples, the memory die 200 may be configured to remap access operations to utilize different components or circuitry of the memory die 200, such as remapping operations to utilize a different (e.g., redundant) row decoder 220, column decoder 225, sense component 245, I/O component 255, local memory controller 260, or various components thereof or various combinations thereof. Such remapping may be performed by way of a logical reconfiguration (e.g., at the local memory controller) or by way of a physical reconfiguration (e.g., via a switching component, via a fuse or anti-fuse). In some examples, a post-package repair may be associated with a memory system 110 disabling or idling a first memory die 200, and remapping access operations to a second, different memory die 200 (e.g., of the same memory system 110).

Figure 3:
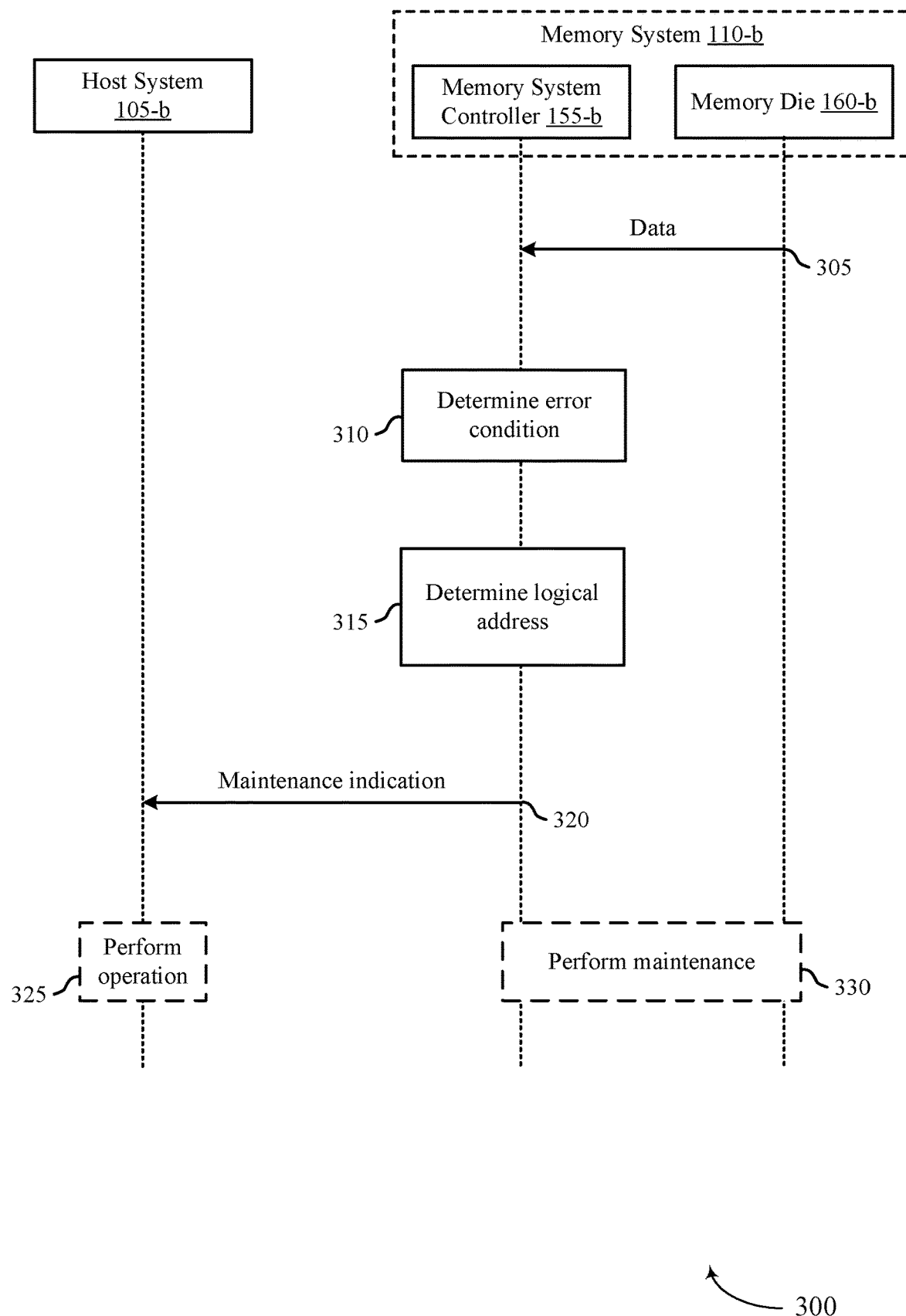
FIGS. 3 through 6 illustrate examples of process flows that supports maintenance command interfaces for a memory system in accordance with examples as disclosed herein.

FIG. 3 illustrates an example of a process flow 300 that supports maintenance command interfaces for a memory system in accordance with examples as disclosed herein. The process flow 300 is described with reference to a host system 105-b and a memory system 110-b, which may be physically or operatively coupled via an interface (e.g., via channels 115, according to a memory interface or memory protocol). The memory system 110-b may include a memory system controller 155-b and a memory die 160-b. Although the memory system 110-b is illustrated with one memory die 160, a memory system 110 in accordance with aspects of the process flow 300 may include any quantity of memory dies 160. Further, although the host system 105-b is illustrated as being coupled with one memory system 110, a host system 105 in accordance with aspects of the process flow 300 may be coupled with any quantity of memory systems 110. The process flow 300 may illustrate aspects of a memory-initiated maintenance in accordance with examples as disclosed herein.

At 305, the memory system 110-b (e.g., the memory system controller 155-b) may receive data from the memory die 160-b. In some examples, the data may be received by accessing one or more memory cells 205 of the memory die 160-b, which may be responsive to a command from the host system 105-b (e.g., a read command received by the memory system controller 155-b and processed to access the memory die 160-b), or may be responsive to other accessing within the memory system 110-b (e.g., related to memory management techniques of the memory system 110-b, not responsive to a command from the host system 105-b).

At 310, the memory system 110-b (e.g., the memory system controller 155-b) may determine an error condition associated with a physical address of the memory die 160-b. For example, the memory system controller 155-b may determine that a quantity of errors in the data of 305 satisfies a threshold, or that a rate of errors in the data of 305 satisfies a threshold.

At 315, the memory system 110-b (e.g., the memory system controller 155-b) may determine a logical address associated with the data of 305 (e.g., corresponding to the physical address of the memory die 160-b). In some examples, the memory system 110-b may determine a DPA (e.g., according to an L2P mapping of the memory system 110-b), or an HPA (e.g., according to an HDM decoder of the memory system 110-b), or both.

At 320, the memory system 110-b (e.g., the memory system controller 155-b) may transmit a maintenance indication to the host system 105-b (e.g., an indication of a maintenance operation for repairing the physical address of the memory die 160-b). Transmitting the maintenance indication of 320 may be based at least in part on determining the error condition (e.g., at 310), or determining the logical address associated with the data of 305 (e.g., at 315), or both. In some examples, the maintenance indication of 320 may include an indication that the memory system 110-b is or will be performing a maintenance operation. In some examples, the maintenance indication of 320 may include a request to perform a maintenance operation (e.g., requesting permission or an explicit command from the host system 105-b).

In some examples, at 325, the host system 105-b may perform an operation based on receiving the maintenance indication of 320. In some examples, the host system 105-b may issue a command (e.g., to the memory system 110-b) to perform a maintenance operation or to refrain from performing a maintenance operation. In some examples, the host system 105-b may indicate to the memory system 110-b that data associated with the indicated address may be purged, or that an address may be retired.

In some examples, at 330, the memory system 110-b may perform a maintenance operation. For example, the memory system 110-b (e.g., the memory system controller 155-b) may initiate a post-package repair on the memory die 160-b. In various examples, performing the maintenance operation of 330 may be based on determining the error condition (e.g., at 310), or an operation performed by the host system 105-b (e.g., at 325), such as a transmission of a maintenance command by the host system 105-b.

Additionally or alternatively, in some examples of the present disclosure, one or more maintenance operations may be implemented by a controller (e.g., memory system controller 155-b), such as a controller of the memory system, that may implement one or more maintenance operations. For example, the controller (e.g., that may be inside a memory module) may copy data from one or more addresses (e.g., one or more component rows) that are in need of repair to one or more resources in or coupled with the controller (e.g., dedicated SRAM for the controller, SRAM or other storage coupled with the controller). The controller may be configured to manage an update (e.g., a remap, a write) of the one or more addresses into a second one or more resources in or coupled with the controller (e.g., dedicated SRAM for the controller, SRAM or other storage coupled with the controller), such as a remap of the one or more addresses into other resources that contain the accurate data.

Although described in the context of maintenance performed on an identified physical address of the memory die 160-b (e.g., associated with an error of the physical address), the described techniques can be understood to be extended to additional circumstances. For example, the memory system 110-b may identify a need for maintenance that is not directly or strictly related to or limited to a physical address of the memory die 160-b detected to have an error. Such maintenance may be more-generally related to storage medium of the memory die 160-b, and may be triggered by one or more other conditions. In such examples, the maintenance indication of 320 may omit an indication of an address (e.g., not include an indication of an HPA, DPA, or other address).

Figure 4:
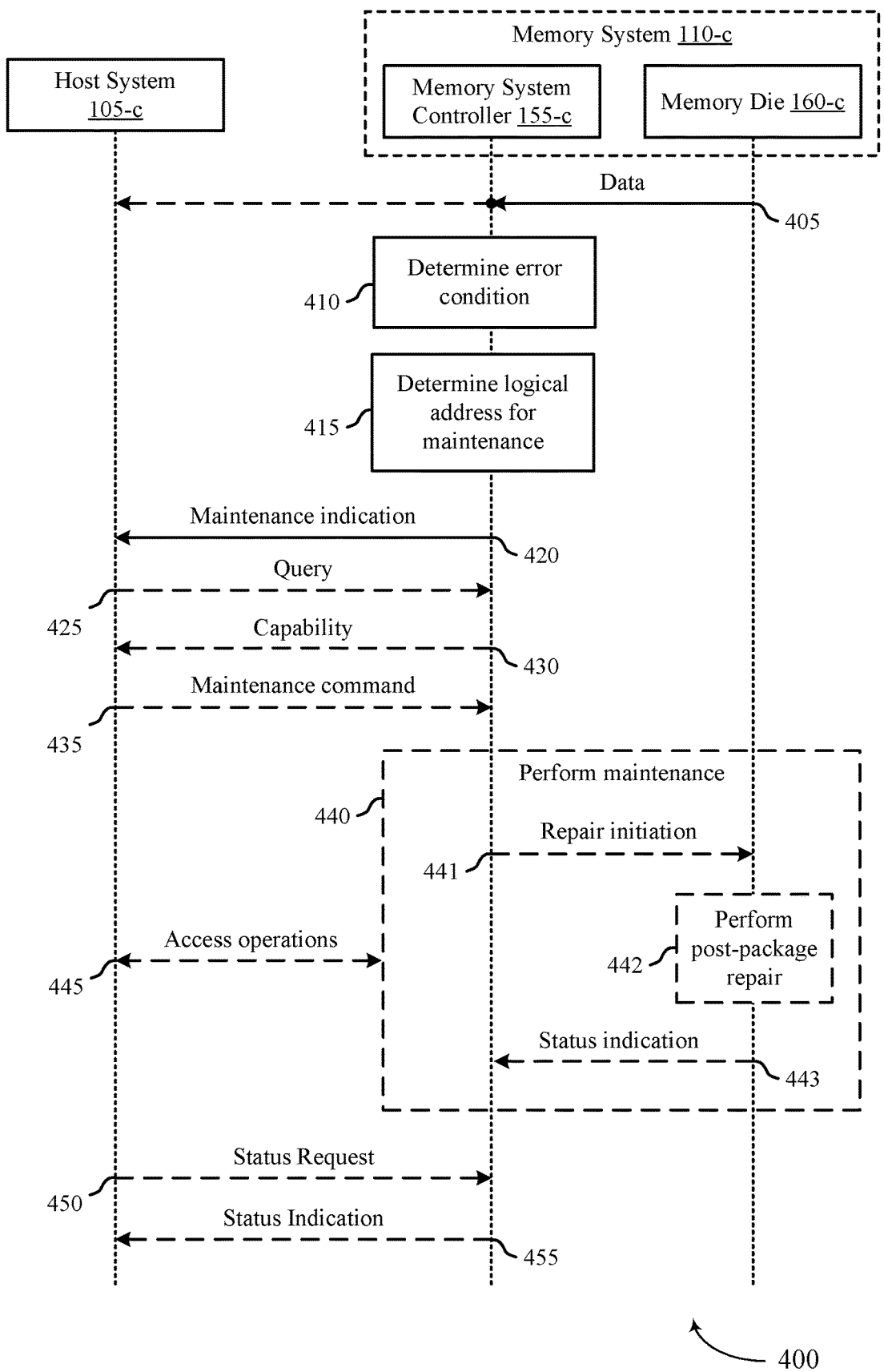

FIG. 4 illustrates an example of a process flow 400 that supports maintenance command interfaces for a memory system in accordance with examples as disclosed herein. The process flow 400 is described with reference to a host system 105-c and a memory system 110-c, which may be physically or operatively coupled via an interface (e.g., via channels 115, according to a memory interface or memory protocol). The memory system 110-c may include a memory system controller 155-c and a memory die 160-c. Although the memory system 110-c is illustrated with one memory die 160, a memory system 110 in accordance with aspects of the process flow 400 may include any quantity of memory dies 160. Further, although the host system 105-c is illustrated as being coupled with one memory system 110, a host system 105 in accordance with aspects of the process flow 400 may be coupled with any quantity of memory systems 110.

The process flow 400 may illustrate aspects of a memory-initiated maintenance in accordance with examples as disclosed herein. The process flow 400 and related descriptions may include various enhancements to a Module Event Record (e.g., a Memory Module Event Record of an Event Record of the memory system 110-c), which may include adding various information related to maintenance. The process flow 400 and related descriptions may also illustrate implementations of a dedicated command set in a Memory Device Command interface to manage maintenance operations, including examples of capability indications, status indications, and registers for such management.

At 405, the memory system 110-c (e.g., the memory system controller 155-c) may receive data from the memory die 160-c. In some examples, the data may be received by accessing one or more memory cells 205 of the memory die 160-c. In some examples, the receipt of data at the memory system controller 155-c may be responsive to a command from the host system 105-c (e.g., a read command received by the memory system controller 155-c and processed to access the memory die 160-c) and, in some examples, the data received from the memory die 160-c may be forwarded to the host system 105-c. In some examples, the receipt of data at the memory system controller 155-c may be responsive to other accessing within the memory system 110-c (e.g., related to memory management techniques of the memory system 110-c, not responsive to a command from the host system 105-c) and, in some examples, such data may not be forwarded to the host system 105-c.

At 410, the memory system 110-c (e.g., the memory system controller 155-c) may determine an error condition associated with a physical address of the memory die 160-c. For example, the memory system controller 155-c may determine that a quantity of errors in the data of 405 satisfies a threshold, or that a rate of errors in the data of 405 satisfies a threshold, or that some threshold amount of errors or data poison (e.g., indication that a number of errors satisfies a threshold, code indicating erroneous data) are otherwise present in the data of 405. In some examples, based at least in part on determining the error condition (e.g., that a quantity or proportion or errors satisfies a threshold), the memory system 110-c (e.g., the memory system controller 155-c) may determine to initiate or execute internal maintenance operations (e.g., to perform the maintenance of 440).

At 415, the memory system 110-c (e.g., the memory system controller 155-c) may determine a logical address associated with the data of 405 (e.g., corresponding to the physical address of the memory die 160-c). In some examples, the memory system 110-c may determine a DPA (e.g., according to an L2P mapping of the memory system 110-c), or an HPA (e.g., according to an HDM decoder of the memory system 110-c), or both.

At 420, the memory system 110-c (e.g., the memory system controller 155-c) may transmit or otherwise convey a maintenance indication to the host system 105-c (e.g., an indication of a maintenance operation for repairing the physical address of the memory die 160-c, an indication of a memory event). Transmitting the maintenance indication of 420 may be based at least in part on determining the error condition (e.g., at 410), or determining the logical address associated with the data of 405 (e.g., at 415), or both. In various examples, the maintenance indication of 420 may be implemented as an interrupt by the memory system 110-c, as a response to the host system 105-c polling a dedicated register of the memory system 110-c, or through a transaction issued by the memory system 110-c. The maintenance indication of 420 may include an indication of a maintenance operation type, or an address of the memory system 110-c (e.g., an HPA, a DPA), or both.

In some examples, the maintenance indication of 420 may include an indication that the memory system 110-c is or will be performing a maintenance operation (e.g., performing a memory-initiated maintenance operation, without receiving or waiting for an explicit maintenance command from the host system 105-c. For example, the memory system 110-c may identify that an internal maintenance operation is needed, and the memory system 110-a may report a maintenance event to the host system 105-c.

In some examples, the maintenance indication of 420 may include a request to perform a maintenance operation (e.g., requesting permission or an explicit command from the host system 105-c). In examples where the maintenance indication of 420 is associated with such a request, the memory system 110-c may wait for a response from the host system 105-c prior to performing a maintenance operation.

TABLE 1

Memory Module Event Record

| Byte offset | Length | Field | Description |
|---|---|---|---|
| 00h | 10h | Event Record Identifier | xx ... xxh |
| 10h | 20h | Common event record | Event Record Length<br>Event Record Flags<br>(See Table 2)<br>Event Record Handle<br>Related Event Record Handle<br>Event Record Timestamp |
| 30h | 1h | Device Event Type | 00h (Health Status Change) |
| 31h | 12h | Device Health Information | Maintenance Needed (byte 49:01h) |
| 43h | 1h | Maintenance Operation | 00h: no operation<br>01h: Memory module repair<br>Other: reserved |
| 44h | 8h | Address (eg., DPA, HPA) | Target address for the repair |
| 4Bh | 35h | Reserved | [. . .] |

Table 1 illustrates a first example of a memory module event record that may support signaling the maintenance indication of 420. In some examples, a memory module event record may be implemented as a register at the memory system 110-c (e.g., of the memory system controller 155-c), which may be polled by the host system 105-c. In some examples, a similar or alternative event record may be implemented at the memory die 160-c (e.g., as a DRAM event record). The memory module event record may include a Device Health Information field that may indicate whether maintenance is needed at the memory system 110-a. The memory module event record may also include a Maintenance Operation field indicating various details of the maintenance operation, such as a maintenance operation type. In some examples, a value of 00 h may indicate "no operation" which may indicate an unrepairable portion of the memory system 110-c, or that a location of the memory system 110-c is not repairable due to, for example, a lack of maintenance resources, or that a maintenance operation selection may be performed by the host system 105-c. In some examples, an Address field may be used to indicate an address of the detected error, such as a DPA, an HPA, or a physical address of the memory system 110-c (e.g., of the memory die 160-c), though an address may be omitted in the event that a more-general maintenance is being indicated (e.g., maintenance more generally related to a storage medium of the memory die 160-c). In some examples, one or more fields of the memory module event record may be provisioned to support a generic parameter, or be redefined for other applications. Table 2 illustrates an example of event record flags that may be implemented in the Common Event Record field of the memory module event record, such as a "Maintenance Needed" field that the memory system 110-c may use for the maintenance indication of 420.

TABLE 2

Event Record Flags
Event Record Flags

| Bits | Description |
|---|---|
| 1:0 | Event Record Severity |
| 2 | Permanent Condition |
| 3 | Maintenance Needed |
| 4 | Performance Degraded |
| 5 | Hardware Replacement Needed |
| 23:6 | Reserved |

In an example, for the maintenance indication of 420, the memory system 110-c may use a module event record given in Table 3 as a "maintenance needed" indication:

TABLE 3

Module Event Record for Maintenance Needed Indication

| Byte offset | Field | Value |
|---|---|---|
| 00h | Event Record Identifier | xx ... xxh |
| 10h | Event Record Length | 80h |
| 11h | Event Record Flags | (See Table 4) |
| 14h | Event Record Handle | XXXXh |
| 16h | Related Event Record Handle | 0000h |
| 18h | Event Record Timestamp | xx ... xxh |
| 20h | Reserved | 0 ... 0h |
| 30h | Device Event Type | 00h (Health Status Change) |
| 31h | Device Health Information | Maintenance Needed (byte 49:01h) |
| 43h | Maintenance operation | 01h Memory module repair |
| 44h | HPA | XX ... XXh |
| 4Bh | Reserved | 0 ... 0h |

TABLE 4

Event Record Flags for Maintenance Needed Indication
Event Record Flags

| Bits | Description | Value |
|---|---|---|
| 1:0 | Event Record Severity | 01b (warning) |
| 2 | Permanent Condition | 1b |
| 3 | Maintenance Needed | 1b |
| 4 | Performance Degraded | 0b |
| 5 | Hardware Replacement Needed | 0b |
| 23:6 | Reserved | Xx |

The host system 105-c may perform various operations based on receiving the maintenance indication of 420. For example, the host system 105-c may issue one or more signals or indications according to the Maintenance Command Set of Table 5:

TABLE 3

Maintenance Command Set

| Opcode | | | | | Input | Output |
|---|---|---|---|---|---|---|
| Command Set Bits [15:8] | | Command Bits [7:0] | | Combined Opcode | Required | Payload Size [B] | Payload Size [B] |
| 47h | Maintenance Command | 00h | Start Maintenance | 4700h | M | 0Ah | 0h |
| | | 01h | Get Maintenance Command Status | 4701h | M | 0Ah | 8h |

TABLE 3-continued

| Maintenance Command Set | | | | | |
|---|---|---|---|---|---|
| Opcode | | | | Input | Output |
| Command Set Bits [15:8] | Command Bits [7:0] | Combined Opcode | Required | Payload Size [B] | Payload Size [B] |
| | 02h | Check Maintenance Resources | 4702h | M | 0Ah | 8h |

In some examples, the host system 105-c and the memory system 110-c may be configured to support various aspects of capability signaling relative to a maintenance operation (e.g., of 440). For example, at 425, the host system 105-c may transmit a query (e.g., using a Check Maintenance Resources field of the Maintenance Command Set) to the memory system 110-c to request an indication of a capability of the memory system 110-c for performing maintenance operations. The memory system 110-c may respond, at 430, with a capability indication. Such a capability indication may indicate a quantity of available repairs at the memory system 110-c, such as a quantity of swappable rows for a remapping operation, or some other quantity of redundant or otherwise available components. In some examples, such a capability indication may include a quantity of available maintenance operations organized or conveyed by maintenance operation type, or other maintenance parameters such as latencies or timeouts associated with each type of maintenance command supported by the memory system 110-c. In some examples, the query of 425 may include a query by the host system 105-c of whether a target address (e.g., a target DPA, a target HPA) is repairable. Although described in the context of a handshake or responsive signaling, in some examples, a capability indication of 430 may be signaled proactively (e.g., without a transmission or receipt of a query of 425). In some examples, capability signaling may be omitted, not configured, or otherwise not performed, in which case the operations of 425 and 430 may be omitted.

In some examples, the host system 105-c and the memory system 110-c may be configured to support various aspects of maintenance requests and responsive commands relative to the maintenance of 440. For example, when the maintenance indication of 420 includes a request by the memory system 110-c to perform a maintenance operation, at 435, the host system 105-c may transmit a responsive maintenance command, which may be an explicit command for the memory system 110-c to perform the maintenance operation of 440 (e.g., using a Start Maintenance field of the Maintenance Command Set). In some examples, a maintenance command of 435 may be an explicit command to start a maintenance operation on the target address (e.g., DPA, HPA) as indicated by the memory system 110-c itself.

In some examples, a maintenance request of 420 may indicate a type of maintenance operation, and the host system 105-c may evaluate whether to approve the requested maintenance operation, refuse the request maintenance operation, or issue a maintenance command for a different type of operation. For example, in response a request of 420, the host system 105-c may transmit a maintenance command to initiate a soft repair to minimize execution latency, or may transmit a command to refrain from performing the maintenance operation, or to retire an address from an address space (e.g., retiring an HPA or a DPA indicated in the maintenance indication of 420, such as when the addressed data is no longer needed). In some examples, a maintenance command of 435 may be issued at a later time, based on a delay determined by the host system 105-c, or may specify a time for the memory system 110-c to perform a maintenance operation. In some examples, such a request of the maintenance indication of 420 may be in accordance with Start Maintenance Input Parameters, such as those given in Table 4.

TABLE 4

Start Maintenance Input Parameters

| Bytes | Description |
|---|---|
| 0 | Action: Specifies the maintenance operation (e.g., soft PPR, hard PPR)<br>00h = Memory module repair 0 (fast repair operation)<br>01h = Memory module repair 1 (long repair operation)<br>Other values reserved. |
| 1 | Maintenance Interrupt Settings: When enabled, the device shall signal an interrupt when maintenance operation completes.<br>Bits[1:0]: Interrupt Mode<br>00b = No interrupts<br>01b = MSI/MSI-X<br>10b = FW Interrupt (EFN VDM)<br>11b = Reserved<br>Bits[3:2]: Reserved<br>Bits[7:4]: Interrupt Message Number. |
| 9-2 | DPA |

In an example, for the maintenance command of 435, the host system 105-c may use a Start Maintenance Command as given in Table 3 as a maintenance command:

TABLE 6

Start Maintenance Commands (4700h)

| Bytes | Description | Value |
|---|---|---|
| 0 | Action | 00h (Memory module repair 0 - fast repair operation) |
| 1 | Maintenance Interrupt Settings | 00h (No interrupts) |
| 9-2 | DPA | XX . . . XXh |

In some examples, the memory system 110-c may be configured to provide a return code in response to a maintenance command of 435 (e.g., using the Output Payload of Table 3). In some examples, such a return code may be stored at a register of the memory system 110-c, such that the host system 105-c may transmit a command at 435 and read the register for the return code or other output payload. In various examples, such a return code may indicate a success, an invalid parameter, an unsupported operation, an internal error, that a retry is required, that the memory system 110-c is busy (e.g., that another maintenance command is being processed), that the maintenance operation was aborted, that resources for repair have been exhausted, various command effects, or that the maintenance operation has been performed.

In some examples, the host system 105-c may be configured to copy data from the memory system 110-c (e.g., as transferred from the memory system 110-c at 405, associated with a logical or physical address indicated in a maintenance indication of 420) to a different location. For example, a performed maintenance operation may be destructive to logic states stored at the memory die 160-c, or the host system 105-c may proactively save or retrieve data inferred to be stored in a degrading portion of the memory die 160-c. In some examples, such data that is transferred may include data as transferred at 405, as well as other data that may be affected by a maintenance operation. In some examples, the host system 105-c may evaluate or determine whether such data is valid before performing such a transfer.

In some examples, at 440, the memory system 110-c may perform a maintenance operation. For example, at 441, the memory system 110-c (e.g., the memory system controller 155-c) may initiate a post-package repair on the memory die 160-c, which may include transmitting a repair initiation signal or command to the memory die 160-c. In various examples, performing the maintenance operation of 430 may be based on determining the error condition (e.g., at 410), or an operation performed by the host system 105-c, such as a transmission of a maintenance command by the host system 105-c (e.g., at 435). At 442, the memory die 160-c may perform a post-package repair (e.g., responsive to the signaling of 441). In some examples, at 443, the memory die 160-c may provide an indication of a status (e.g., a completion) of the post package repair, which may include an explicit indication (e.g., a bit, a flag), or an implicit indication (e.g., an indication that the memory die 160-c is available for access).

In various examples, the maintenance performed at 440 may be performed in a foreground or background. For example, in a background operation, the memory system 110-c may support ongoing access operations (e.g., at 445), such as supporting read or write commands issued by the host system 105-c. In a foreground maintenance operation, the memory system 110-c may not support ongoing operations, and therefore may refrain from performing access operations during the maintenance operations of 440. In some examples, the memory system 110-c may provide an indication of a capability for performing access operations during the maintenance operations (e.g., in the capability indication at 430). In some examples, if the execution of the maintenance operation of 440 exceeds two seconds, or some other threshold duration, the maintenance operation may be moved to a background process.

In some examples, the host system 105-c and the memory system 110-c may be configured to support various aspects of status signaling relative to the maintenance of 440. For example, at 455, the memory system 110-c may transmit an indication of the status of the maintenance operation of 440. If the status indication of 455 is transmitted after the completion of the maintenance operation of 440 (e.g., as shown), the status indication of 455 may indicate that the maintenance operation is complete. If the status indication of 455 is transmitted before a completion of the maintenance operation of 440, the status indication of 455 may indicate that the maintenance operation of 440 is ongoing, which may include an indication of a completion percentage or remaining percentage or duration, or the status indication of 455 may indicate that the maintenance operation of 440 has failed or has been aborted. In some examples, a status indication may be signaled proactively, such as according to a duration after receiving a maintenance command or according to a percentage completion (e.g., where the memory system 110-c may indicate operation progress in cases of relatively long operations). In other examples, a status indication of 455 may be responsive to a request, such as a status request transmitted by the host system 105-c at 450 to check the status of the maintenance operation. In some examples, such a request may refer to a polling of a status register of the memory system 110-c. In some examples, the status indication of 455 may be provided in accordance with a Get Maintenance Command Status command (e.g., of a Maintenance Command set illustrated in Table 3).

Additionally or alternatively, in some examples of the present disclosure, one or more maintenance operations may be implemented by a controller (e.g., memory system controller 155-c), such as a controller of the memory system, that may implement one or more maintenance operations. For example, the controller (e.g., that may be inside a memory module) may copy data from one or more addresses (e.g., one or more component rows) that are in need of repair to one or more resources in or coupled with the controller (e.g., dedicated SRAM for the controller, SRAM or other storage coupled with the controller). The controller may be configured to manage an update (e.g., a remap, a write) of the one or more addresses into a second one or more resources in or coupled with the controller (e.g., dedicated SRAM for the controller, SRAM or other storage coupled with the controller) such as a remap of the one or more addresses into other resources that contain the accurate data.

Figure 5:
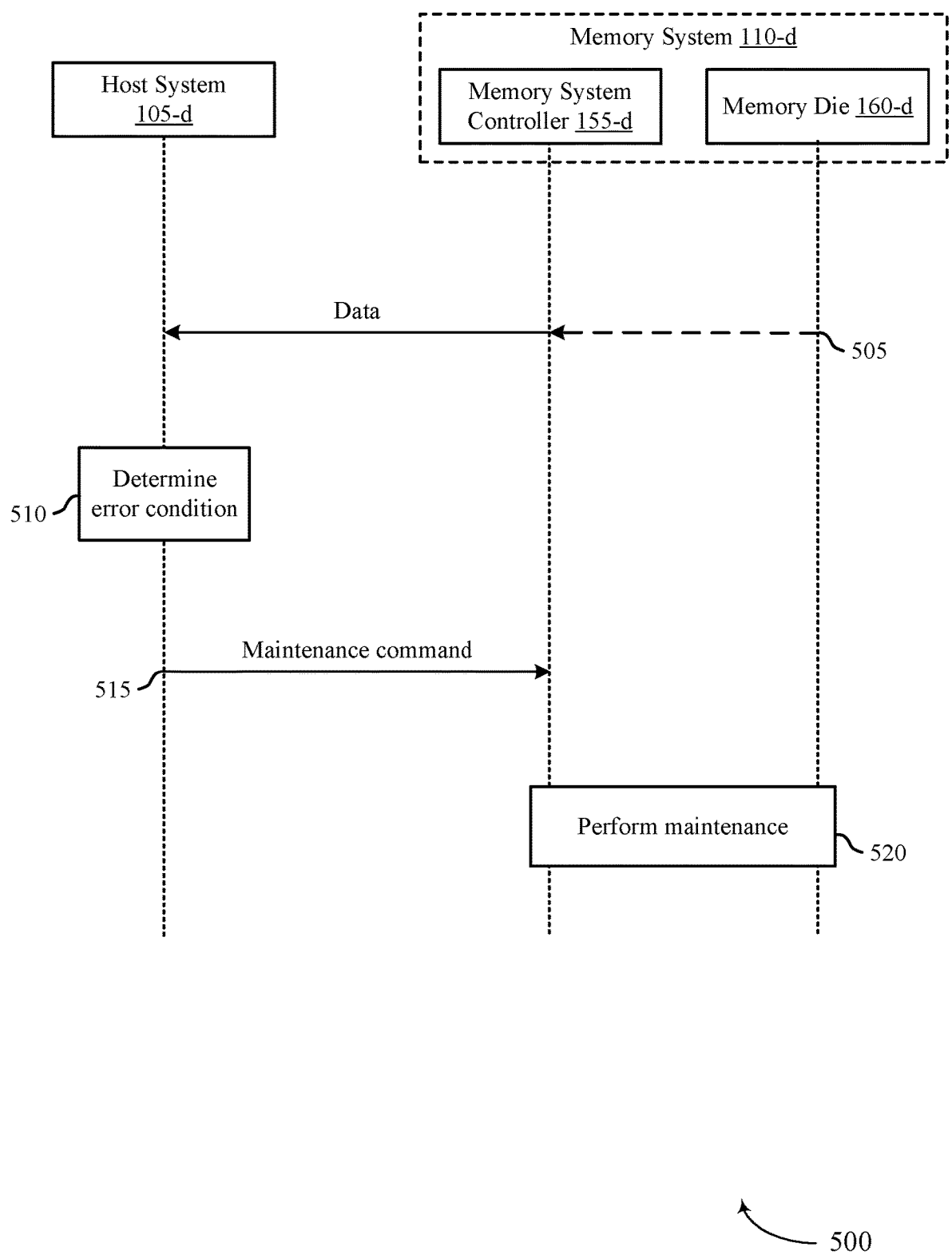

FIG. 5 illustrates an example of a process flow 500 that supports maintenance command interfaces for a memory system in accordance with examples as disclosed herein. The process flow 500 is described with reference to a host system 105-d and a memory system 110-d, which may be physically or operatively coupled via an interface (e.g., via channels 115, according to a memory interface or memory protocol). The memory system 110-d may include a memory system controller 155-d and a memory die 160-d. Although the memory system 110-d is illustrated with one memory die 160, a memory system 110 in accordance with aspects of the process flow 500 may include any quantity of memory dies 160. Further, although the host system 105-d is illustrated as being coupled with one memory system 110, a host system 105 in accordance with aspects of the process flow 500 may be coupled with any quantity of memory systems 110. The process flow 500 may illustrate aspects of a host-initiated maintenance in accordance with examples as disclosed herein.

At 505, the host system 105-d may receive data from the memory system 110-d (e.g., from the memory system controller 155-d). The data of 505 may be associated with a logical address of the memory system 110-d (e.g., an HPA, a DPA). In some examples, the data may be retrieved from the memory die 160-d by accessing one or more memory cells 205 of the memory die 160-d, which may be responsive to a command from the host system 105-d (e.g., a read command received by the memory system controller 155-d and processed to access the memory die 160-d), or may be responsive to other accessing within the memory system 110-d (e.g., related to memory management techniques of the memory system 110-d, not responsive to a command from the host system 105-d).

At 510, the host system 105-d may determine an error condition associated with a physical address of the memory system 110-d (e.g., of the memory die 160-d, based on the data of 505). For example, the host system 105-*d* may determine that a quantity of errors in the data of 505 satisfies a threshold, or that a rate of errors in the data of 505 satisfies a threshold.

At 515, the host system 105-*d* may transmit a maintenance command to the memory system 110-*d* (e.g., a command to perform a maintenance operation associated with the logical address of the memory system 110-*d*). Transmitting the maintenance command at 515 may be based at least in part on determining the error condition at 510.

At 520, the memory system 110-*d* may perform a maintenance operation (e.g., based on receiving the command of 515). For example, the memory system 110-*d* (e.g., the memory system controller 155-*d*) may initiate a post-package repair on the memory die 160-*d*.

Additionally or alternatively, in some examples of the present disclosure, one or more maintenance operations may be implemented by a controller (e.g., memory system controller 155-*d*), such as a controller of the memory system, that may implement one or more maintenance operations. For example, the controller (e.g., that may be inside a memory module) may copy data from one or more addresses (e.g., one or more component rows) that are in need of repair to one or more resources in or coupled with the controller (e.g., dedicated SRAM for the controller, SRAM or other storage coupled with the controller). The controller may be configured to manage an update (e.g., a remap, a write) of the one or more addresses into a second one or more resources in or coupled with the controller (e.g., dedicated SRAM for the controller, SRAM or other storage coupled with the controller), such as a remap of the one or more addresses into other resources that contain the accurate data.

Although described in the context of a maintenance performed on a physical address of the memory die 160-*d* (e.g., associated with an error of the physical address), the described techniques may be extended to additional circumstances. For example, the host system 105-*d* may identify a need for maintenance that is not strictly related to or limited to a physical address of the memory die 160-*d* detected to have an error. Such maintenance may be more generally related to storage medium of the memory die 160-*d*, and may be triggered by other various conditions.

Figure 6:
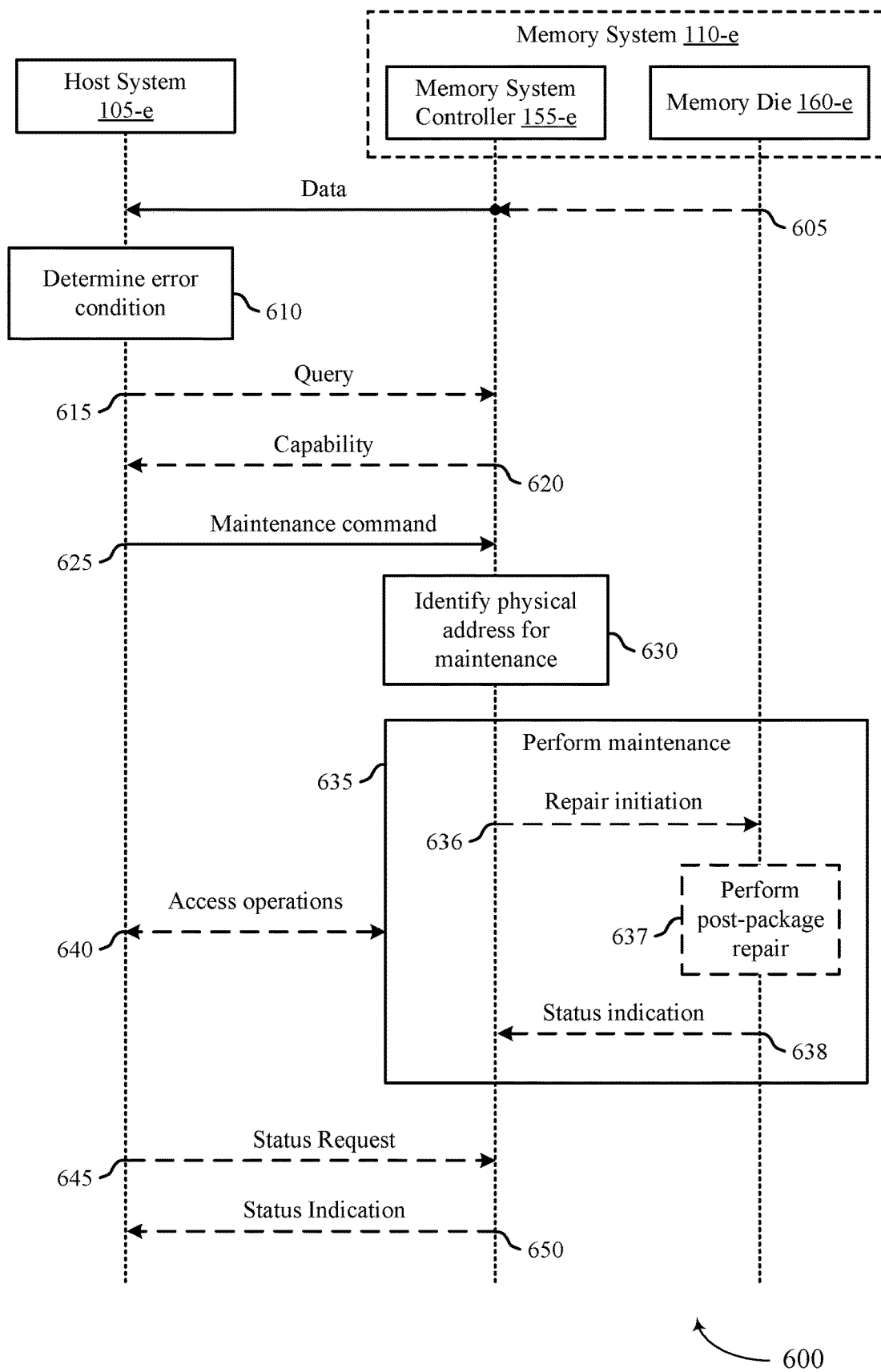

FIG. 6 illustrates an example of a process flow 600 that supports maintenance command interfaces for a memory system in accordance with examples as disclosed herein. The process flow 600 is described with reference to a host system 105-*e* and a memory system 110-*e*, which may be physically or operatively coupled via an interface (e.g., via channels 115, according to a memory interface or memory protocol). The memory system 110-*e* may include a memory system controller 155-*e* and a memory die 160-*e*. Although the memory system 110-*e* is illustrated with one memory die 160, a memory system 110 in accordance with aspects of the process flow 600 may include any quantity of memory dies 160. Further, although the host system 105-*e* is illustrated as being coupled with one memory system 110, a host system 105 in accordance with aspects of the process flow 600 may be coupled with any quantity of memory systems 110.

The process flow 600 may illustrate aspects of a host-initiated maintenance in accordance with examples as disclosed herein. The process flow 600 and related descriptions may include various enhancements to a Module Event Record (e.g., a Memory Module Event Record of an Event Record of the memory system 110-*e*), which may include adding various information related to maintenance. The process flow 600 and related descriptions may also illustrate implementations of a dedicated command set in a Memory Device Command interface to manage maintenance operations, including examples of capability indications, status indications, and registers for such management.

At 605, the host system 105-*e* may receive data from the memory system 110-*e* (e.g., from the memory system controller 155-*e*). The data of 605 may be associated with a logical address of the memory system 110-*e* (e.g., an HPA, a DPA). In some examples, the data may be retrieved from the memory die 160-*e* by accessing one or more memory cells 205 of the memory die 160-*e*, which may be responsive to a command from the host system 105-*e* (e.g., a read command received by the memory system controller 155-*e* and processed to access the memory die 160-*e*), or may be responsive to other accessing within the memory system 110-*e* (e.g., related to memory management techniques of the memory system 110-*e*, not responsive to a command from the host system 105-*e*).

At 610, the host system 105-*e* may determine an error condition associated with a physical address of the memory system 110-*e* (e.g., of the memory die 160-*e*, based on the data of 605). For example, the host system 105-*e* may determine that a quantity of errors in the data of 605 satisfies a threshold, or that a rate of errors in the data of 605 satisfies a threshold, or that some threshold amount of errors or data poison are otherwise present in the data of 605.

In some examples, the host system 105-*e* may be configured to copy data from the memory system 110-*e* (e.g., as transferred from the memory system 110-*e* at 605, associated with a logical or physical address of the data of 605) to a different location. For example, a performed maintenance operation may be destructive to logic states stored at the memory die 160-*e*, or the host system 105-*e* may proactively save or retrieve data inferred to be stored in a degrading portion of the memory die 160-*e*. In some examples, such data that is transferred may include data as transferred at 605, as well as other data that may be affected by a maintenance operation. In some examples, the host system 105-*e* may evaluate or determine whether such data is valid before performing such a transfer or copying.

In some examples, the host system 105-*e* and the memory system 110-*e* may be configured to support various aspects of capability signaling relative to a maintenance operation (e.g., of 640). For example, at 615 (e.g., based on determining the error condition at 610), the host system 105-*e* may transmit a query (e.g., using a Check Maintenance Resources field of a Maintenance Command Set as illustrated in Table 3) to the memory system 110-*e* to request an indication of a capability of the memory system 110-*e* for performing maintenance operations. The memory system 110-*e* may respond, at 620, with a capability indication. Such a capability indication may indicate a quantity of available repairs at the memory system 110-*e*, such as a quantity of swappable rows for a remapping operation, or some other quantity of redundant or otherwise available components. In some examples, such a capability indication may include a quantity of available maintenance operations organized or conveyed by maintenance operation type, or other maintenance parameters such as latencies or timeouts associated with each type of maintenance command supported by the memory system 110-*e*. In some examples, the query of 615 may include a query by the host system 105-*e* of whether a target address (e.g., a target DPA, a target HPA) is repairable. Although described in the context of a handshake or responsive signaling, in some examples, a capability indication of 620 may be signaled proactively (e.g., without a transmission or receipt of a query of 615). In some examples, capability signaling may be omitted, not configured, or otherwise not performed, in which case the operations of 615 and 620 may be omitted.

At 625, the host system 105-*e* may issue a maintenance command to the memory system 110-*e* (e.g., to the memory system controller 155-*e*). The maintenance command of 625 may be an explicit command for the memory system 110-*e* to perform a maintenance operation of 640 (e.g., using a Start Maintenance field of the Maintenance Command Set as illustrated in Table 3). In some examples, the maintenance command of 625 may be a command to start a maintenance operation on an address (e.g., DPA, HPA) associated with the data 605 and identified by the host system 105-*e* as having an error condition (e.g., at 610). In some examples, a maintenance command of 625 may be issued at a later time, based on a delay determined by the host system 105-*e*, or may specify a time for the memory system 110-*e* to perform a maintenance operation.

In some examples, the memory system 110-*e* may be configured to provide a return code in response to a maintenance command of 625 (e.g., using the Output Payload of Table 3). In some examples, such a return code may be stored at a register of the memory system 110-*e*, such that the host system 105-*e* may transmit a command at 625 and read the register for the return code or other output payload. In various examples, such a return code may indicate a success, an invalid parameter, an unsupported operation, an internal error, that a retry is required, that the memory system 110-*e* is busy (e.g., that another maintenance command is being processed, that the maintenance operation was aborted, various command effects, or that the maintenance operation has been performed.

At 630, the memory system 110-*e* (e.g., the memory system controller 155-*e*) may identify a physical address for performing the commanded maintenance. For example, the maintenance command of 625 may be associated with (e.g., include) an indication of an HPA, which may be translated into a DPA by an HDM decoder of the memory system 110-*c*.

The determined DPA may be further translated using an L2P mapping of the memory system 110-*c* to determine a physical address of the memory die 160-*e* for performing the maintenance operation. Alternatively, in some examples, the maintenance command of 625 may be associated with (e.g., include) an indication of a DPA, which may be translated into a physical address of the memory die 160-*e*.

At 635, the memory system 110-*e* may perform a maintenance operation (e.g., on the physical address identified at 630). For example, at 636, the memory system 110-*e* (e.g., the memory system controller 155-*e*) may initiate a post-package repair on the memory die 160-*e*, which may include transmitting a repair initiation signal or command to the memory die 160-*e*. At 637, the memory die 160-*e* may perform a post-package repair (e.g., responsive to the signaling of 636). In some examples, at 638, the memory die 160-*e* may provide an indication of a status (e.g., a completion) of the post package repair, which may include an explicit indication or an implicit indication.

In various examples, the maintenance performed at 635 may be performed in a foreground or background. For example, in a background operation, the memory system 110-*e* may support ongoing access operations (e.g., at 640), such as supporting read or write commands issued by the host system 105-*e*, or supporting access to configure the memory system 110-*e*, access to discovery capabilities of the memory system 110-*e*, or access to check a status of the memory system 110-*e*. In a foreground maintenance operation, the memory system 110-*e* may not support ongoing operations, and therefore may refrain from performing access operations during the maintenance operations of 635. In some examples, the memory system 110-*e* may provide an indication of a capability for performing access operations during the maintenance operations (e.g., in the capability indication at 620). In some examples, if the execution of the maintenance operation of 635 exceeds two seconds, or some other threshold duration, the maintenance operation may be moved to a background process.

In some examples, the host system 105-*e* and the memory system 110-*e* may be configured to support various aspects of status signaling relative to the maintenance of 635. For example, at 650, the memory system 110-*e* may transmit an indication of the status of the maintenance operation of 635. If the status indication of 650 is transmitted after the completion of the maintenance operation of 635 (e.g., as shown), the status indication of 650 may indicate that the maintenance operation is complete. If the status indication of 650 is transmitted before a completion of the maintenance operation of 635, the status indication of 650 may indicate that the maintenance operation of 635 is ongoing, which may include an indication of a completion percentage or remaining percentage or duration, or the status indication of 650 may indicate that the maintenance operation of 635 has failed or has been aborted. In some examples, a status indication may be signaled proactively, such as according to a duration after receiving a maintenance command or according to a percentage completion (e.g., where the memory system 110-*e* may indicate operation progress in cases of relatively long operations). In other examples, a status indication of 650 may be responsive to a request, such as a status request transmitted by the host system 105-*e* at 645 to check the status of the maintenance operation. In some examples, such a request may refer to a polling of a status register of the memory system 110-*e*. In some examples, the status indication of 650 may be provided in accordance with a Get Maintenance Command Status command (e.g., of a Maintenance Command set illustrated in Table 3).

Additionally or alternatively, in some examples of the present disclosure, one or more maintenance operations may be implemented by a controller (e.g., memory system controller 155-*e*), such as a controller of the memory system, that may implement one or more maintenance operations. For example, the controller (e.g., that may be inside a memory module) may copy data from one or more addresses (e.g., one or more component rows) that are in need of repair to one or more resources in or coupled with the controller (e.g., dedicated SRAM for the controller, SRAM or other storage coupled with the controller). The controller may be configured to manage an update (e.g., a remap, a write) of the one or more addresses into a second one or more resources in or coupled with the controller (e.g., dedicated SRAM for the controller, SRAM or other storage coupled with the controller), such as a remap of the one or more addresses into other resources that contain the accurate data.

Figure 7:
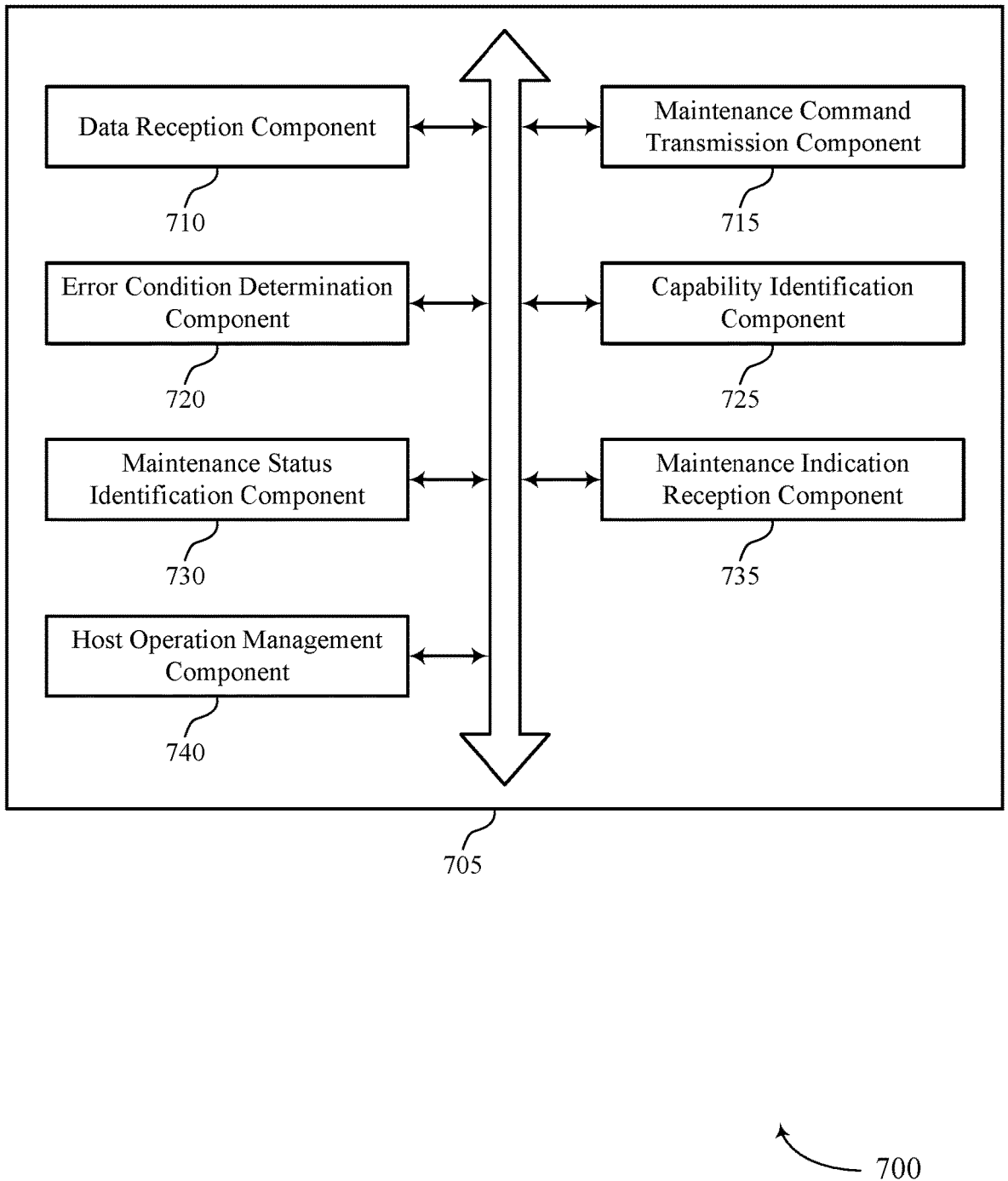
FIG. 7 shows a block diagram of a host system that supports maintenance command interfaces for a memory system in accordance with aspects of the present disclosure.

FIG. 7 shows a block diagram 700 of a host system 705 that supports maintenance command interfaces for a memory system in accordance with examples as disclosed herein. The host system 705 may be an example of aspects of a host system as described with reference to FIGS. 1 through 6, and may include circuitry configured for coupling with a memory system. The host system 705 may include a data reception component 710, a maintenance command transmission component 715, an error condition determination component 720, a capability identification component 725, a maintenance status identification component 730, a maintenance indication reception component 735, and a host operation management component 740. Each of these modules may communicate, directly or indirectly, with one another (e.g., via one or more buses).

The data reception component 710 may receive, from a memory system, data associated with a logical address of the memory system.

The maintenance command transmission component 715 may transmit, to the memory system and based on determining that a physical address of the memory system associated with the logical address has an error condition, a command to perform a maintenance operation associated with the logical address of the memory system.

In some examples, the maintenance command transmission component 715 may transmit, to the memory system, an indication of the logical address of the memory system with the command. In some examples, the maintenance command transmission component 715 may transmit, to the memory system, an indication of a type of maintenance operation with the command.

In some examples, the maintenance command transmission component 715 may determine a delay between determining to perform the maintenance operation and transmitting the command to perform the maintenance operation, and the command to perform the maintenance operation may be transmitted in accordance with the delay. In some examples, the maintenance command transmission component 715 may transmit, to the memory system, an indication for the memory system to delay performing the maintenance operation. In some cases, the command may indicate a time to perform the maintenance operation or a delay before performing the maintenance operation.

In some examples, the maintenance command transmission component 715 may transmit, to the memory system, a command to perform the maintenance operation based on receiving a request. In some examples, the maintenance command transmission component 715 may transmit, to the memory system, a command to refrain from performing the maintenance operation based on receiving a request.

In some examples, the maintenance command transmission component 715 may transmit, to the memory system, an indication that the memory system may purge data associated with the physical address. In some examples, the maintenance command transmission component 715 may transmit, to the memory system, an indication that the memory system may retire a logical address mapping associated with the physical address.

The error condition determination component 720 may determine that a quantity of errors in the data or a proportion of errors in the data satisfies a threshold.

The capability identification component 725 may receive an indication of a capability from the memory system. In some examples, the capability identification component 725 may determine a capability of the memory system to perform a maintenance operation based on receiving the indication. In some examples, the capability identification component 725 may transmit a query to the memory system based on determining to perform the maintenance operation, and receive the indication of the capability in response to transmitting the query.

In some examples, receiving the indication of the capability of the memory system may include the capability identification component 725 reading a register of the memory system and identifying a combination of bits written to the register that indicate the capability of the memory system. In some cases, the indication of the capability includes an indication of whether a portion of the memory system associated with the logical address is repairable, or a quantity of available resources for repairs of the memory system, or a combination thereof.

The maintenance status identification component 730 may receive an indication of a status of the maintenance operation. In some examples, the maintenance status identification component 730 may transmit a request to the memory system, and receive the indication of the status of the maintenance operation in response to transmitting the request.

The maintenance indication reception component 735 may receive, from a memory system, an indication of a maintenance operation for repairing a physical address of the memory system. In some examples, the maintenance indication reception component 735 may receive, from the memory system, a request to perform the maintenance operation. In some examples, the maintenance indication reception component 735 may receive, from the memory system, an indication that the memory system is performing the maintenance operation.

In some examples, the maintenance indication reception component 735 may receive, from the memory system, an indication of a logical address corresponding to the physical address. In some examples, the maintenance indication reception component 735 may receive, from the memory system, an indication of the physical address. In some examples, the maintenance indication reception component 735 may receive, from the memory system, an indication of a type of maintenance operation.

The host operation management component 740 may perform an operation of the host system based on receiving the indication of the maintenance operation.

Figure 8:
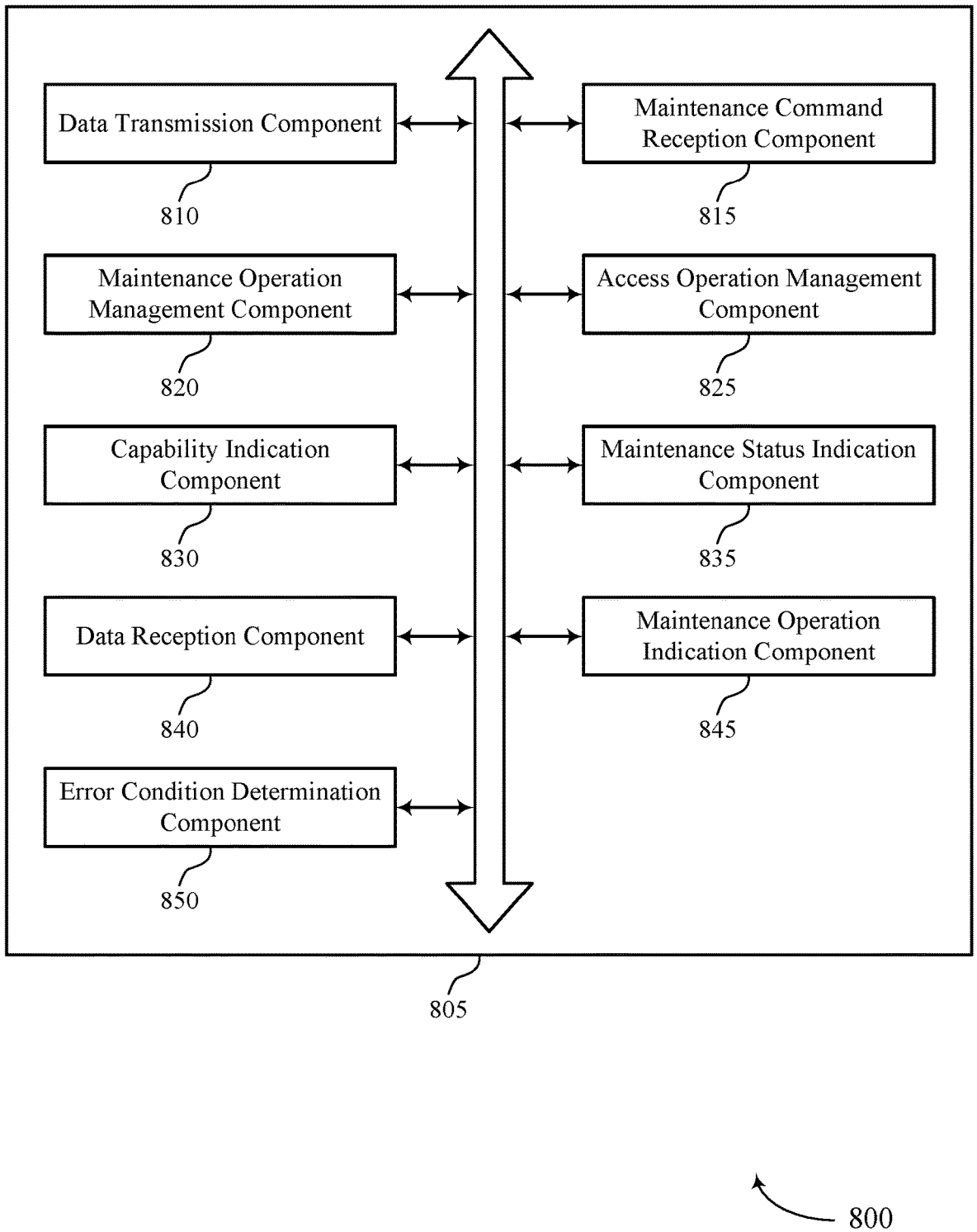
FIG. 8 shows a block diagram of a memory system that supports maintenance command interfaces for a memory system in accordance with aspects of the present disclosure.

FIG. 8 shows a block diagram 800 of a memory system 805 that supports maintenance command interfaces for a memory system in accordance with examples as disclosed herein. The memory system 805 may be an example of aspects of a memory system as described with reference to FIGS. 1 through 6. The memory system 805 may include one or more memory dies each having a plurality of memory cells. The memory system 805 may also include circuitry configured for coupling with a host system, and for operating the one or more memory dies. The memory system 805 may include a data transmission component 810, a maintenance command reception component 815, a maintenance operation management component 820, an access operation management component 825, a capability indication component 830, a maintenance status indication component 835, a data reception component 840, a maintenance operation indication component 845, and an error condition determination component 850. Each of these modules may communicate, directly or indirectly, with one another (e.g., via one or more buses).

The data transmission component 810 may transmit, to a host system, data associated with a logical address of the memory system 805.

The maintenance command reception component 815 may receive, from the host system, a command to perform a maintenance operation associated with the logical address of the memory system 805. In some examples, the maintenance command reception component 815 may receive an indication of a type of maintenance operation with the command. In some cases, the command may indicate a time to perform the maintenance operation or a delay before performing the maintenance operation.

The maintenance operation management component 820 may perform the maintenance operation on a memory die of the memory system 805 based on receiving the command to perform the maintenance operation associated with the logical address of the memory system 805 and determining a physical address of the memory die corresponding to the logical address.

In some examples, the maintenance operation management component 820 (e.g., a controller of or coupled with the maintenance operation management component 820) may initiate a repair operation. For example, one or more maintenance operations may be implemented by a controller (e.g., a controller of or coupled with the maintenance operation management component 820), such as a controller of the memory system. The controller (e.g., that may be inside a memory module, a controller of or coupled with the maintenance operation management component 820) may copy data from one or more addresses (e.g., one or more component rows) that are in need of repair to one or more resources in or coupled with the controller (e.g., dedicated SRAM for the controller, SRAM or other storage coupled with the controller). The controller may be configured to manage an update (e.g., a remap, a write) of the one or more addresses into a second one or more resources in or coupled with the controller (e.g., dedicated SRAM for the controller, SRAM or other storage coupled with the controller), such as a remap of the one or more addresses into other resources that contain the accurate data. In some examples, one or more maintenance operations implemented by the controller may be a vendor-specific repair operation that may be different than alternative repair operations, such as post-package repair (PPR). In some examples, the maintenance operation management component 820 may initiate a post-package repair operation on the memory die. In some examples, the maintenance operation management component 820 may receive an indication of the logical address of the memory system 805 with a command. In some examples, the maintenance operation management component 820 may perform the maintenance operation based on receiving a command. In some examples, the maintenance operation management component 820 may initiate a post-package repair operation on or according to a physical address of the memory die.

The data reception component 840 may receive data from a memory die of the memory system 805.

The maintenance operation indication component 845 may transmit, to a host system and based on determining an error condition associated with a physical address of the memory die and determining a logical address corresponding to the physical address of the memory die, an indication of a maintenance operation for repairing the physical address of the memory die.

In some examples, the maintenance operation indication component 845 may transmit, to the host system, a request to perform the maintenance operation. In some examples, the maintenance operation indication component 845 may receive, from the host system, a command to perform the maintenance operation based on transmitting the request to perform the maintenance operation.

In some examples, the maintenance operation indication component 845 may transmit, to the host system, an indication that the memory system is performing the maintenance operation.

In some examples, the maintenance operation indication component 845 may transmit, to the host system, an indication of the logical address. In some examples, the maintenance operation indication component 845 may transmit, to the host system, an indication of the physical address. In some examples, the maintenance operation indication component 845 may transmit, to the host system, an indication of a type of maintenance operation.

The access operation management component 825 may inhibit access operations of the memory system 805 while performing the maintenance operation on the memory die. In some examples, the access operation management component 825 may perform access operations of the memory system 805 while performing the maintenance operation on the memory die.

The capability indication component 830 may transmit, to the host system, an indication of a capability from the memory system 805, and receiving a command to perform a maintenance operation may be based on transmitting the indication. In some examples, the capability indication component 830 may receive a query from the host system, and transmit the indication of the capability responsive to receiving the query. In some examples, to transmit the indication of the capability of the memory system 805, the capability indication component 830 may transmit, from a register of the memory system 805, a combination of bits written to the register that indicate the capability of the memory system 805. In some cases, the indication of the capability includes an indication of whether a portion of the memory system associated with the logical address is repairable, or a quantity of available resources for repairs of the memory system, or a combination thereof.

The maintenance status indication component 835 may transmit, to the host system, an indication of a status of a maintenance operation. In some examples, the maintenance status indication component 835 may receive a request from the host system, and transmit the indication of the status of the maintenance operation responsive to receiving the request.

In some examples, the maintenance operation management component 820 may perform a maintenance operation based on error condition determination component 850 determining the error condition associated with the physical address of the memory die.

In some examples, the maintenance operation management component 820 may determine to perform the maintenance operation based on the error condition determination component 850 determining that a quantity of errors in the data or a proportion of errors in the data satisfies a threshold.

Figure 9:
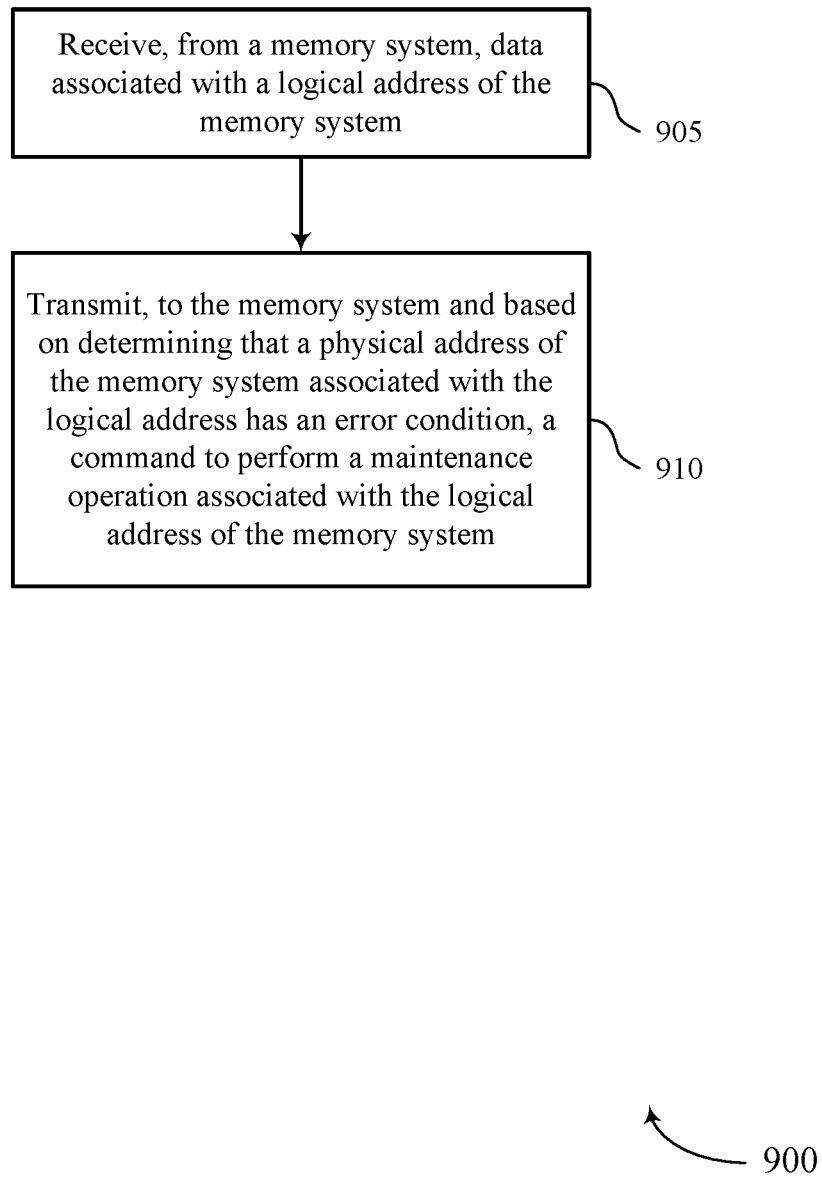
FIGS. 9 through 12 show flowcharts illustrating a method or methods that support maintenance command interfaces for a memory system in accordance with examples as disclosed herein.

FIG. 9 shows a flowchart illustrating a method or methods 900 that supports maintenance command interfaces for a memory system in accordance with aspects of the present disclosure. The operations of method 900 may be implemented by a host system or its components as described herein. For example, the operations of method 900 may be performed by a host system as described with reference to FIG. 7. In some examples, a host system may execute a set of instructions to control the functional elements of the host system to perform the described functions. Additionally or alternatively, a host system may perform aspects of the described functions using special-purpose hardware.

At 905, the host system may receive, from a memory system, data associated with a logical address of the memory system. The operations of 905 may be performed according to the methods described herein. In some examples, aspects of the operations of 905 may be performed by a data reception component as described with reference to FIG. 7.

At 910, the host system may transmit, to the memory system and based on determining that a physical address of the memory system associated with the logical address has an error condition, a command to perform a maintenance operation associated with the logical address of the memory system. The operations of 910 may be performed according to the methods described herein. In some examples, aspects of the operations of 910 may be performed by a maintenance command transmission component as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor) for receiving, at a host system from a memory system, data associated with a logical address of the memory system and transmitting, to the memory system and based on determining that a physical address of the memory system associated with the logical address has an error condition, a command to perform a maintenance operation associated with the logical address of the memory system.

Some examples of the method 900 and the apparatus described herein may further include operations, features, circuitry, logic, means, or instructions for transmitting, to the memory system, an indication of the logical address of the memory system with the command.

Some examples of the method 900 and the apparatus described herein may further include operations, features, circuitry, logic, means, or instructions for transmitting, to the memory system, an indication of a type of maintenance operation with the command.

Some examples of the method 900 and the apparatus described herein may further include operations, features, circuitry, logic, means, or instructions for determining that a quantity of errors in the data or a proportion of errors in the data satisfies a threshold.

Some examples of the method 900 and the apparatus described herein may further include operations, features, circuitry, logic, means, or instructions for receiving, at the host system, an indication of a capability from the memory system, and determining a capability of the memory system to perform the maintenance operation based on receiving the indication.

In some examples of the method 900 and the apparatus described herein, the indication of the capability includes an indication of whether a portion of the memory system associated with the logical address is repairable, or a quantity of available resources for repairs of the memory system, or a combination thereof.

Some examples of the method 900 and the apparatus described herein may further include operations, features, circuitry, logic, means, or instructions for transmitting a query to the memory system based on determining to perform the maintenance operation, and receiving the indication of the capability may be responsive to transmitting the query.

In some examples of the method 900 and the apparatus described herein, receiving the indication of the capability of the memory system may include operations, features, circuitry, logic, means, or instructions for reading a register of the memory system and identifying a combination of bits written to the register that indicate the capability of the memory system.

Some examples of the method 900 and the apparatus described herein may further include operations, features, circuitry, logic, means, or instructions for receiving, at the host system, an indication of a status of the maintenance operation.

Some examples of the method 900 and the apparatus described herein may further include operations, features, circuitry, logic, means, or instructions for transmitting a request to the memory system, and receiving the indication of the status of the maintenance operation may be responsive to transmitting the request.

In some examples of the method 900 and the apparatus described herein, the command indicates a time to perform the maintenance operation or a delay before performing the maintenance operation.

Some examples of the method 900 and the apparatus described herein may further include operations, features, circuitry, logic, means, or instructions for determining a delay between determining to perform the maintenance operation and transmitting the command to perform the maintenance operation, and the command to perform the maintenance operation may be transmitted in accordance with the delay.

Some examples of the method 900 and the apparatus described herein may further include operations, features, circuitry, logic, means, or instructions for determining that the data is valid and saving the date at a location different than the physical address of the memory system based at least in part on determining that the data is valid.

Figure 10:
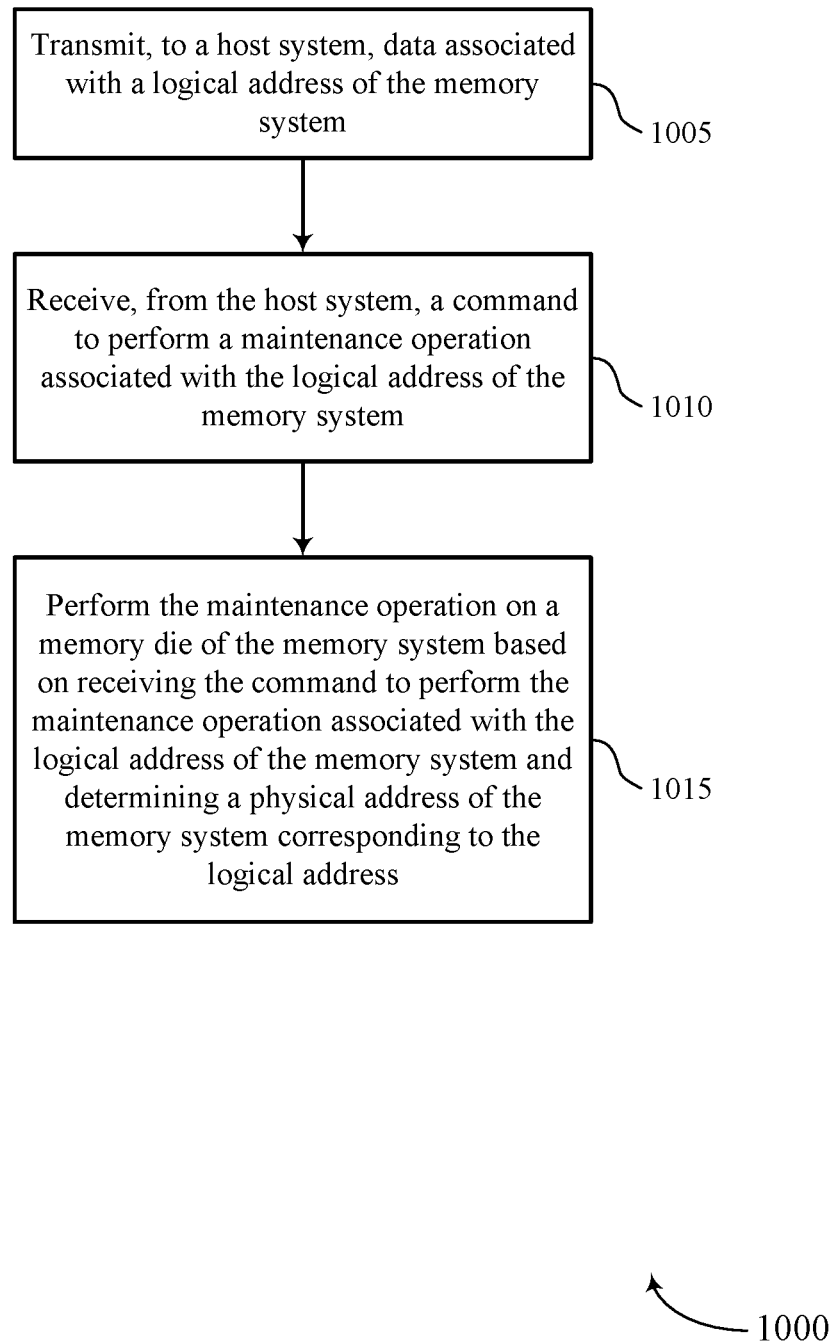

FIG. 10 shows a flowchart illustrating a method or methods 1000 that supports maintenance command interfaces for a memory system in accordance with aspects of the present disclosure. The operations of method 1000 may be implemented by a memory system or its components as described herein. For example, the operations of method 1000 may be performed by a memory system as described with reference to FIG. 8. In some examples, a memory system may execute a set of instructions to control the functional elements of the memory system to perform the described functions. Additionally or alternatively, a memory system may perform aspects of the described functions using special-purpose hardware.

At 1005, the memory system may transmit, to a host system, data associated with a logical address of the memory system. The operations of 1005 may be performed according to the methods described herein. In some examples, aspects of the operations of 1005 may be performed by a data transmission component as described with reference to FIG. 8.

At 1010, the memory system may receive, from the host system, a command to perform a maintenance operation associated with the logical address of the memory system. The operations of 1010 may be performed according to the methods described herein. In some examples, aspects of the operations of 1010 may be performed by a maintenance command reception component as described with reference to FIG. 8.

At 1015, the memory system may perform the maintenance operation on a memory die of the memory system based on receiving the command to perform the maintenance operation associated with the logical address of the memory system and determining a physical address of the memory system corresponding to the logical address. The operations of 1015 may be performed according to the methods described herein. In some examples, aspects of the operations of 1015 may be performed by a maintenance operation management component as described with reference to FIG. 8.

In some examples, an apparatus as described herein may perform a method or methods, such as the method 1000. The apparatus may include features, circuitry, logic, means, or instructions (e.g., a non-transitory computer-readable medium storing instructions executable by a processor) for transmitting, from a memory system to a host system, data associated with a logical address of the memory system, receiving, at the memory system and from the host system, a command to perform a maintenance operation associated with the logical address of the memory system, and performing the maintenance operation on a memory die of the memory system based on receiving the command to perform the maintenance operation associated with the logical address of the memory system and determining a physical address of the memory system corresponding to the logical address.

Some examples of the method 1000 and the apparatus described herein may further include operations, features, circuitry, logic, means, or instructions for inhibiting access operations of the memory system while performing the maintenance operation on the memory die.

Some examples of the method 1000 and the apparatus described herein may further include operations, features, circuitry, logic, means, or instructions for performing access operations of the memory system while performing the maintenance operation on the memory die.

In some examples of the method 1000 and the apparatus described herein, performing the maintenance operation may include operations, features, circuitry, logic, means, or instructions for initiating a maintenance operation. In some examples, a controller may initiate a repair operation. For example, one or more maintenance operations may be implemented by a controller, such as a controller of the memory system. The controller (e.g., that may be inside a memory module) may copy data from one or more addresses (e.g., one or more component rows) that are in need of repair to one or more resources in or coupled with the controller (e.g., dedicated SRAM for the controller, SRAM or other storage coupled with the controller). The controller may be configured to manage an update (e.g., a remap, a write) of the one or more addresses into a second one or more resources in or coupled with the controller (e.g., dedicated SRAM for the controller, SRAM or other storage coupled with the controller), such as a remap of the one or more addresses into other resources that contain the accurate data. In some examples, one or more maintenance operations implemented by the controller may be a vendor-specific repair operation that may be different than alternative repair operations, such as post-package repair (PPR).

In some examples of the method 1000 and the apparatus described herein, performing the maintenance operation may include operations, features, circuitry, logic, means, or instructions for initiating a post-package repair operation on the memory die.

Some examples of the method 1000 and the apparatus described herein may further include operations, features, circuitry, logic, means, or instructions for receiving, at the memory system, an indication of the logical address of the memory system with the command.

Some examples of the method 1000 and the apparatus described herein may further include operations, features, circuitry, logic, means, or instructions for receiving, at the memory system, an indication of a type of maintenance operation with the command.

Some examples of the method 1000 and the apparatus described herein may further include operations, features, circuitry, logic, means, or instructions for transmitting, to the host system, an indication of a capability from the memory system, and receiving the command to perform the maintenance operation may be based on transmitting the indication.

In some examples of the method 1000 and the apparatus described herein, the indication of the capability includes an indication of whether a portion of the memory system associated with the logical address may be repairable, or a quantity of available resources for repairs of the memory system, or a combination thereof.

Some examples of the method 1000 and the apparatus described herein may further include operations, features, circuitry, logic, means, or instructions for receiving a query from the host system, and transmitting the indication of the capability may be responsive to receiving the query.

In some examples of the method 1000 and the apparatus described herein, transmitting the indication of the capability of the memory system may include operations, features, circuitry, logic, means, or instructions for transmitting, from a register of the memory system, a combination of bits written to the register that indicate the capability of the memory system.

Some examples of the method 1000 and the apparatus described herein may further include operations, features, circuitry, logic, means, or instructions for transmitting, to the host system, an indication of a status of the maintenance operation.

Some examples of the method 1000 and the apparatus described herein may further include operations, features, circuitry, logic, means, or instructions for receiving a request from the host system, and transmitting the indication of the status of the maintenance operation may be responsive to receiving the request.

In some examples of the method 1000 and the apparatus described herein, the command indicates a time to perform the maintenance operation or a delay before performing the maintenance operation.

Figure 11:
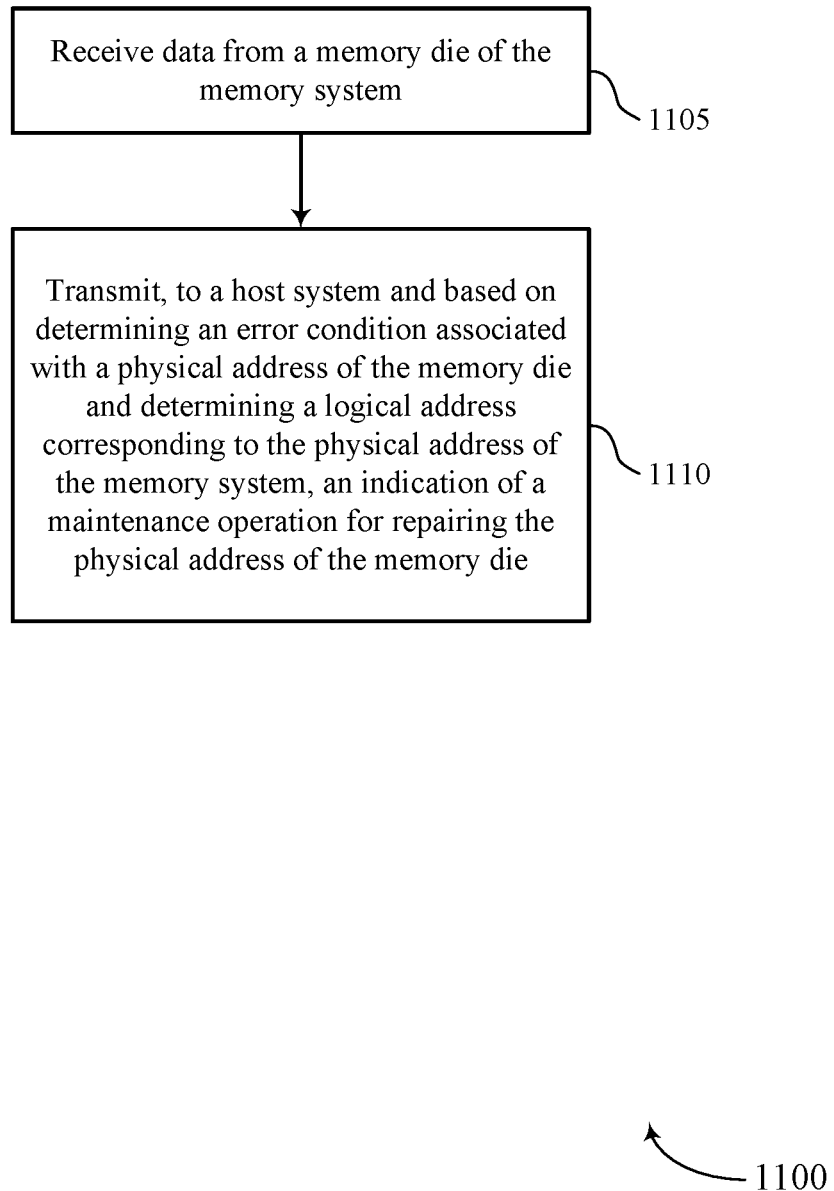

FIG. 11 shows a flowchart illustrating a method or methods 1100 that supports maintenance command interfaces for a memory system in accordance with aspects of the present disclosure. The operations of method 1100 may be implemented by a memory system or its components as described herein. For example, the operations of method 1100 may be performed by a memory system as described with reference to FIG. 8. In some examples, a memory system may execute a set of instructions to control the functional elements of the memory system to perform the described functions. Additionally or alternatively, a memory system may perform aspects of the described functions using special-purpose hardware.

At 1105, the memory system may receive data from a memory die of the memory system. The operations of 1105 may be performed according to the methods described herein. In some examples, aspects of the operations of 1105 may be performed by a data reception component as described with reference to FIG. 8.

At 1110, the memory system may transmit, to a host system and based on determining an error condition associated with a physical address of the memory die and determining a logical address corresponding to the physical address of the memory system, an indication of a maintenance operation for repairing the physical address of the memory die. The operations of 1110 may be performed according to the methods described herein. In some examples, aspects of the operations of 1110 may be performed by a maintenance operation indication component as described with reference to FIG. 8.

In some examples, an apparatus as described herein may perform a method or methods, such as the method 1100. The apparatus may include features, circuitry, logic, means, or instructions (e.g., a non-transitory computer-readable medium storing instructions executable by a processor) for receiving, at a memory system, data from a memory die of the memory system and transmitting, to a host system and based on determining an error condition associated with a physical address of the memory die and determining a logical address corresponding to the physical address of the memory system, an indication of a maintenance operation for repairing the physical address of the memory die.

In some examples of the method 1100 and the apparatus described herein, transmitting the indication of the maintenance operation may include operations, features, circuitry, logic, means, or instructions for transmitting, to the host system, a request to perform the maintenance operation.

Some examples of the method 1100 and the apparatus described herein may further include operations, features, circuitry, logic, means, or instructions for receiving, from the host system, a command to perform the maintenance operation based on transmitting the request to perform the maintenance operation, and performing the maintenance operation based on receiving the command.

Some examples of the method 1100 and the apparatus described herein may further include operations, features, circuitry, logic, means, or instructions for performing the maintenance operation based on determining the error condition associated with the physical address of the memory die.

In some examples of the method 1100 and the apparatus described herein, transmitting the indication of the maintenance operation may include operations, features, circuitry, logic, means, or instructions for transmitting, to the host system, an indication that the memory system is performing the maintenance operation.

Some examples of the method 1100 and the apparatus described herein may further include operations, features, circuitry, logic, means, or instructions for inhibiting access operations of the memory system while performing the maintenance operation on the memory die.

Some examples of the method 1100 and the apparatus described herein may further include operations, features, circuitry, logic, means, or instructions for performing access operations of the memory system while performing the maintenance operation on the memory die.

In some examples of the method 1100 and the apparatus described herein, performing the maintenance operation may include operations, features, circuitry, logic, means, or instructions for initiating a post-package repair operation on the physical address of the memory die.

In some examples of the method 1100 and the apparatus described herein, transmitting the indication of the maintenance operation may include operations, features, circuitry, logic, means, or instructions for transmitting, to the host system, an indication of the logical address.

In some examples of the method 1100 and the apparatus described herein, transmitting the indication of the maintenance operation may include operations, features, circuitry, logic, means, or instructions for transmitting, to the host system, an indication of the physical address.

In some examples of the method 1100 and the apparatus described herein, transmitting the indication of the maintenance operation may include operations, features, circuitry, logic, means, or instructions for transmitting, to the host system, an indication of a type of maintenance operation.

Some examples of the method 1100 and the apparatus described herein may further include operations, features, circuitry, logic, means, or instructions for determining to perform the maintenance operation based on a quantity of errors in the data or a proportion of errors in the data satisfying a threshold.

Some examples of the method 1100 and the apparatus described herein may further include operations, features, circuitry, logic, means, or instructions for transmitting, to the host system, an indication of a status of the maintenance operation.

Some examples of the method 1100 and the apparatus described herein may further include operations, features, circuitry, logic, means, or instructions for receiving a request from the host system, and transmitting the indication of the status of the maintenance operation may be responsive to receiving the request.

Figure 12:
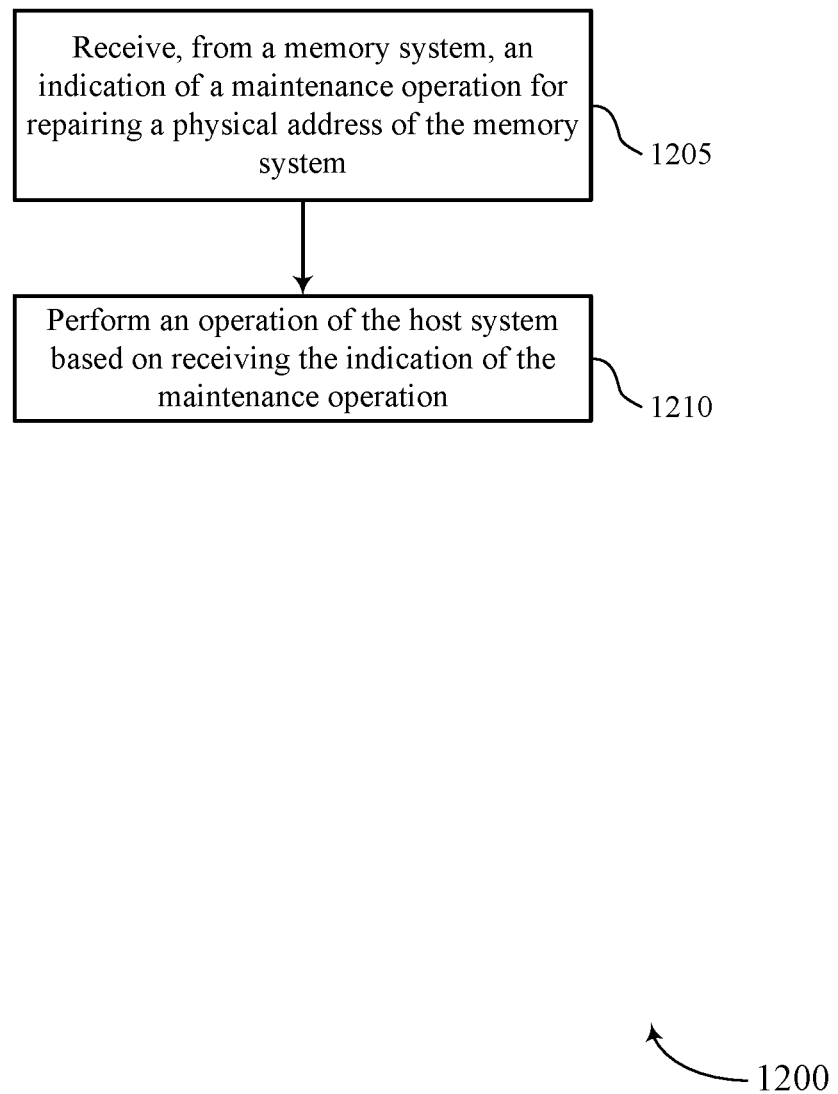

FIG. 12 shows a flowchart illustrating a method or methods 1200 that supports maintenance command interfaces for a memory system in accordance with aspects of the present disclosure. The operations of method 1200 may be implemented by a host system or its components as described herein. For example, the operations of method 1200 may be performed by a host system as described with reference to FIG. 7. In some examples, a host system may execute a set of instructions to control the functional elements of the host system to perform the described functions. Additionally or alternatively, a host system may perform aspects of the described functions using special-purpose hardware.

At 1205, the host system may receive, from a memory system, an indication of a maintenance operation for repairing a physical address of the memory system. The operations of 1205 may be performed according to the methods described herein. In some examples, aspects of the operations of 1205 may be performed by a maintenance indication reception component as described with reference to FIG. 7.

At 1210, the host system may perform an operation of the host system based on receiving the indication of the maintenance operation. The operations of 1210 may be performed according to the methods described herein. In some examples, aspects of the operations of 1210 may be performed by a host operation management component as described with reference to FIG. 7.

In some examples, an apparatus as described herein may perform a method or methods, such as the method 1200. The apparatus may include features, circuitry, logic, means, or instructions (e.g., a non-transitory computer-readable medium storing instructions executable by a processor) for receiving, at a host system from a memory system, an indication of a maintenance operation for repairing a physical address of the memory system and performing an operation of the host system based on receiving the indication of the maintenance operation.

In some examples of the method 1200 and the apparatus described herein, receiving the indication of the maintenance operation may include operations, features, circuitry, logic, means, or instructions for receiving, from the memory system, a request to perform the maintenance operation.

In some examples of the method 1200 and the apparatus described herein, performing the operation of the host system may include operations, features, circuitry, logic, means, or instructions for transmitting, to the memory system, a command to perform the maintenance operation based on receiving the request.

In some examples of the method 1200 and the apparatus described herein, performing the operation of the host system may include operations, features, circuitry, logic, means, or instructions for transmitting, to the memory system, a command to refrain from performing the maintenance operation based on receiving the request.

In some examples of the method 1200 and the apparatus described herein, receiving the indication of the maintenance operation may include operations, features, circuitry, logic, means, or instructions for receiving, from the memory system, an indication that the memory system is performing the maintenance operation.

In some examples of the method 1200 and the apparatus described herein, performing the operation of the host system may include operations, features, circuitry, logic, means, or instructions for transmitting, to the memory system, an indication that the memory system may purge data associated with the physical address.

In some examples of the method 1200 and the apparatus described herein, performing the operation of the host system may include operations, features, circuitry, logic, means, or instructions for transmitting, to the memory system, an indication that the memory system may retire a logical address mapping associated with the physical address.

In some examples of the method 1200 and the apparatus described herein, performing the operation of the host system may include operations, features, circuitry, logic, means, or instructions for receiving data associated with the physical address of the memory system, determining that the data is valid, and saving the data at a location different than the physical address of the memory system based at least in part on determining that the data is valid.

In some examples of the method 1200 and the apparatus described herein, performing the operation of the host system may include operations, features, circuitry, logic, means, or instructions for transmitting, to the memory system, an indication for the memory system to delay performing the maintenance operation.

In some examples of the method 1200 and the apparatus described herein, receiving the indication of the maintenance operation may include operations, features, circuitry, logic, means, or instructions for receiving, from the memory system, an indication of a logical address corresponding to the physical address.

In some examples of the method 1200 and the apparatus described herein, receiving the indication of the maintenance operation may include operations, features, circuitry, logic, means, or instructions for receiving, from the memory system, an indication of the physical address.

In some examples of the method 1200 and the apparatus described herein, receiving the indication of the maintenance operation may include operations, features, circuitry, logic, means, or instructions for receiving, from the memory system, an indication of a type of maintenance operation.

Some examples of the method 1200 and the apparatus described herein may further include operations, features, circuitry, logic, means, or instructions for receiving, from the memory system, an indication of a status of the maintenance operation.

Some examples of the method 1200 and the apparatus described herein may further include operations, features, circuitry, logic, means, or instructions for transmitting a request to the memory system, and receiving the indication of the status of the maintenance operation may be responsive to transmitting the request.

It should be noted that the methods described herein describe possible implementations, and that the operations and the steps may be rearranged or otherwise modified and that other implementations are possible. Further, portions from two or more of the methods may be combined.

An apparatus is described. The apparatus may include circuitry configured for coupling with a memory system. The circuitry may be operable to receive, from the memory system, data associated with a logical address of the memory system, and transmit, to the memory system and based at least in part on determining that a physical address of the memory system associated with the logical address has an error condition, a command to perform a maintenance operation associated with the logical address of the memory system.

Another apparatus is described. The apparatus may include a memory die of a memory system, the memory die comprising a plurality of memory cells, and circuitry of the memory system coupled with the memory die and configured for coupling with a host system. The circuitry may be operable to transmit, to the host system, data associated with a logical address of the memory system, receive, from the host system, a command to perform a maintenance operation associated with the logical address of the memory system, and perform the maintenance operation on the memory die based at least in part on receiving the command to perform the maintenance operation associated with the logical address of the memory system and determining a physical address of the memory system corresponding to the logical address.

Another apparatus is described. The apparatus may include a memory die of a memory system, the memory die comprising a plurality of memory cells, and circuitry of the memory system coupled with the memory die and configured for coupling with a host system. The circuitry may be circuitry operable to receive data from the memory die, and transmit, to the host system based at least in part on determining an error condition associated with a physical address of the memory die and determining a logical address corresponding to the physical address of the memory die, an indication of a maintenance operation for repairing the physical address of the memory die.

Another apparatus is described. The apparatus may include circuitry configured for coupling with a memory system. The circuitry may be operable to receive, from the memory system, an indication of a maintenance operation for repairing a physical address of the memory system, and perform an operation based at least in part on receiving the indication of the maintenance operation from the memory system.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
receiving, at a host system from a memory system, data associated with a logical address of the memory system; and
transmitting, to the memory system and based at least in part on determining that a physical address of the memory system associated with the logical address has an error condition, a command to perform a maintenance operation associated with the logical address of the memory system.

2. The method of claim 1, further comprising:
transmitting, to the memory system, an indication of the logical address of the memory system with the command.

3. The method of claim 1, further comprising:
transmitting, to the memory system, an indication of a type of maintenance operation with the command.

4. The method of claim 1, further comprising:
determining that a quantity of errors in the data or a proportion of errors in the data satisfies a threshold.

5. The method of claim 1, further comprising:
receiving, at the host system, an indication of a capability from the memory system; and
determining a capability of the memory system to perform the maintenance operation based at least in part on receiving the indication.

6. The method of claim 5, wherein the indication of the capability comprises an indication of whether a portion of the memory system associated with the logical address is repairable, or a quantity of available resources for repairs of the memory system, or a combination thereof.

7. The method of claim 5, further comprising:
transmitting a query to the memory system based at least in part on determining to perform the maintenance operation, wherein receiving the indication of the capability is responsive to transmitting the query.

8. The method of claim 5, wherein receiving the indication of the capability of the memory system comprises:
reading a register of the memory system; and
identifying a combination of bits written to the register that indicate the capability of the memory system.

9. The method of claim 1, further comprising:
receiving, at the host system, an indication of a status of the maintenance operation.

10. The method of claim 9, further comprising:
transmitting a request to the memory system, wherein receiving the indication of the status of the maintenance operation is responsive to transmitting the request.

11. The method of claim 1, wherein the command indicates a time to perform the maintenance operation or a delay before performing the maintenance operation.

12. The method of claim 1, further comprising:
determining a delay between determining to perform the maintenance operation and transmitting the command to perform the maintenance operation, wherein the command to perform the maintenance operation is transmitted in accordance with the delay.

13. The method of claim 1, further comprising:
determining that the data is valid; and
saving the data at a location different than the physical address of the memory system based at least in part on determining that the data is valid.

14. A method, comprising:
transmitting, from a memory system to a host system, data associated with a logical address of the memory system;
receiving, at the memory system and from the host system, a command to perform a maintenance operation associated with the logical address of the memory system; and
performing the maintenance operation on a memory die of the memory system based at least in part on receiving the command to perform the maintenance operation associated with the logical address of the memory system and determining a physical address of the memory system corresponding to the logical address.

15. The method of claim 14, further comprising:
inhibiting access operations of the memory system while performing the maintenance operation on the memory die.

16. The method of claim 14, further comprising:
performing access operations of the memory system while performing the maintenance operation on the memory die.

17. The method of claim 14, further comprising:
initiating, at a controller coupled with the memory die, a maintenance operation, the maintenance operation comprising copying data from one or more addresses that are in need of repair to one or more resources in or coupled with the controller and comprising remapping the one or more addresses into a second one or more resources in or coupled with the controller.

18. The method of claim 14, wherein performing the maintenance operation comprises:
initiating a post-package repair operation on the memory die.

19. The method of claim 14, further comprising:
receiving, at the memory system, an indication of the logical address of the memory system with the command.

20. The method of claim 14, further comprising:
receiving, at the memory system, an indication of a type of maintenance operation with the command.

21. The method of claim 14, further comprising:
transmitting, to the host system, an indication of a capability from the memory system, wherein receiving the command to perform the maintenance operation is based at least in part on transmitting the indication.

22. The method of claim 21, wherein the indication of the capability comprises an indication of whether a portion of the memory system associated with the logical address is repairable, or a quantity of available resources for repairs of the memory system, or a combination thereof.

23. The method of claim 21, further comprising:
receiving a query from the host system, wherein transmitting the indication of the capability is responsive to receiving the query.

24. The method of claim 21 wherein transmitting the indication of the capability of the memory system comprises:
transmitting, from a register of the memory system, a combination of bits written to the register that indicate the capability of the memory system.

25. The method of claim 14, further comprising:
  transmitting, to the host system, an indication of a status of the maintenance operation.

26. The method of claim 25, further comprising:
  receiving a request from the host system, wherein transmitting the indication of the status of the maintenance operation is responsive to receiving the request.

27. The method of claim 14, wherein the command indicates a time to perform the maintenance operation or a delay before performing the maintenance operation.

* * * * *